United States Patent
Kamio et al.

(10) Patent No.: US 9,217,378 B2
(45) Date of Patent: Dec. 22, 2015

(54) CONTROLLER FOR INTERNAL COMBUSTION ENGINE

(75) Inventors: Junichi Kamio, Wako (JP); Kohei Kuzuoka, Wako (JP); Tadashi Kurotani, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 982 days.

(21) Appl. No.: 13/397,225

(22) Filed: Feb. 15, 2012

(65) Prior Publication Data

US 2012/0215419 A1 Aug. 23, 2012

(30) Foreign Application Priority Data

Feb. 17, 2011 (JP) .................................. 2011-032408
Dec. 26, 2011 (JP) .................................. 2011-284470

(51) Int. Cl.
| | |
|---|---|
| *F01L 1/34* | (2006.01) |
| *F02D 13/02* | (2006.01) |
| *F01L 1/26* | (2006.01) |
| *F02D 41/00* | (2006.01) |

(52) U.S. Cl.
CPC ............ *F02D 13/0223* (2013.01); *F01L 1/267* (2013.01); *F02D 13/023* (2013.01); *F02D 13/0211* (2013.01); *F02D 41/0002* (2013.01); *F02D 41/005* (2013.01); *F02D 2041/001* (2013.01); *Y02T 10/18* (2013.01); *Y02T 10/42* (2013.01); *Y02T 10/47* (2013.01)

(58) Field of Classification Search
CPC .... F01L 1/267; F02D 13/023; F02D 13/0211; F02D 2041/001; Y02T 10/18
USPC ................ 701/103; 123/90.15, 90.16, 90.17, 123/345–348
See application file for complete search history.

(56) References Cited

U.S. PATENT DOCUMENTS

| | | | | | |
|---|---|---|---|---|---|
| 5,159,905 | A | * | 11/1992 | Sugiuchi et al. ............ | 123/90.16 |
| 5,347,962 | A | * | 9/1994 | Nakamura et al. .......... | 123/90.16 |
| 6,360,704 | B1 | * | 3/2002 | Moriya et al. ................ | 123/90.1 |
| 7,222,594 | B2 | * | 5/2007 | Hoshino ...................... | 123/90.15 |
| 7,305,945 | B2 | * | 12/2007 | Glose et al. ................. | 123/90.15 |
| 8,662,042 | B2 | * | 3/2014 | Kamio ......................... | 123/90.17 |

FOREIGN PATENT DOCUMENTS

JP 2005-180306 7/2005

* cited by examiner

*Primary Examiner* — Mahmoud Gimie
*Assistant Examiner* — David Hamaoui
(74) *Attorney, Agent, or Firm* — Squire Patton Boggs (US) LLP

(57) ABSTRACT

A controller for internal combustion engine has an intake cam for low-load operation and an intake cam for high-load operation. The controller switches the intake cam used to open/close an intake valve and changes the phase angle of each intake cam according to load on the internal combustion engine. The controller changes the phase angle at start of opening of intake valve by the intake cam for low-load operation in lag angle direction within a predetermined range as load on the internal combustion engine increases, and changes the phase angle at start of opening of intake valve by the intake cam for high-load operation in lead angle direction within the predetermined range as load on the internal combustion engine increases. Switching between the two intake cams is performed where the phase angles of the intake cams are controlled to predetermined phase angles on a lag angle side.

1 Claim, 15 Drawing Sheets

CONTROLLER FOR INTERNAL COMBUSTION ENGINE

BACKGROUND OF THE INVENTION

1. Field of the Invention

The present invention relates to a controller for an internal combustion engine capable of varying an open valve period and a lift amount of an intake valve.

2. Description of the Related Art

There has been conventionally known an internal combustion engine which has been disclosed in, for example, Japanese Patent Application Laid-Open No. 2005-180306 (hereinafter referred to as patent document 1) and which is provided with, as intake cams used for opening/closing an intake valve, a plurality of intake cams having different profiles that specify the angle width and the lift amount in an open valve period of the intake valve. The internal combustion engine is constructed such that the phase angles of the intake cams relative to the phase angle of a crankshaft (the output shaft of the internal combustion engine) can be changed within a predetermined angle range.

In this type of internal combustion engine, the intake cams used to actually open/close the intake valve are selectively switched by a valve lift changing mechanism, such as VTEC (a registered trademark), to variably change the angle width of the open valve period of the intake valve and the lift amount thereof.

Further, the phase angle of each of the intake cams relative to the phase angle of the crankshaft (the output shaft of the internal combustion engine) is continuously changed by a valve phase changing mechanism, such as VTC, thereby to change the phase angles in the open valve period of an intake valve (to be specific, a pair of the phase angle at a valve opening start and the phase angle at a valve opening end) opened by each of the intake cams.

For example, the internal combustion engine disclosed in patent document 1 has three intake cams, and switches the intake cams and changes the phase angle of each intake cam according to the load on the internal combustion engine. In this case, the switching among the intake cams is implemented such that the angle width of the open valve period of the intake valve and the lift amount thereof increase as the load on the internal combustion engine increases. Further, when the intake valve is driven to open/close by each of the intake cams, the phase angle of each of the intake cams is changed such that the phase angle at the start of opening of the intake valve approaches the phase angle at a top dead center (TDC) from a phase angle on a lead angle side relative to the phase angle at the top dead center as the load on the internal combustion engine increases.

In the internal combustion engine disclosed in patent document 1, when switching among the intake cams, which open/close the intake valve, is implemented, the phase angle of an intake cam on a low-load side, at which the angle width of the open valve period of the intake valve and the lift amount thereof are small, is controlled to a phase angle that causes the phase angle at the opening start of the intake valve defined thereby to substantially coincide with the phase angle at the top dead center (TDC). Further, the phase angle of an intake cam on a high-load side, at which the angle width of the open valve period of the intake valve and the lift amount thereof are large, is controlled to a phase angle that causes the phase angle at the opening start of the intake valve defined thereby to advance to become larger than the phase angle at the top dead center (TDC).

In this case, an unsmooth change in the output of the internal combustion engine can be controlled at the time of the switching among the intake cams. However, in a situation wherein the intake cam on the high-load side is operated to open/close an intake valve in the vicinity of a load where the intake cam switching is carried out, the intake valve will open at a relatively large opening degree in an exhaust stroke. For this reason, the amount of an exhaust gas charged together with air into the combustion chamber during an intake stroke following the exhaust stroke tends to suddenly change. This may cause a misfire or the like, resulting in deteriorated output performance of the internal combustion engine.

SUMMARY OF THE INVENTION

The present invention has been made with a view toward the background described above, and it is an object of the invention to provide a controller for an internal combustion engine that is capable of switching intake cams while restraining a change in the output of the internal combustion engine and the occurrence of misfires. Another object of the invention is to provide a controller for an internal combustion engine that is capable of switching intake cams so as to enable the internal combustion engine to be operated at high thermal efficiency.

To these ends, a first aspect of the present invention provides a controller for an internal combustion engine, including:

an intake valve driving mechanism that has a first intake cam and a second intake cam selectively used to open/close an intake valve, a valve lift changing mechanism that selectively switches an actively driving intake cam, which is an intake cam actually opening/closing the intake valve, to either the first intake cam or the second intake cam, and a valve phase changing mechanism that changes the phase angles of the first and the second intake cams relative to the phase angle of a crankshaft, the profiles of the first and the second intake cams being set such that, in the case where the intake valve is opened/closed by the first intake cam, the lift amount of the intake valve and the angle width of an open valve period are both larger than those in the case where the intake valve is opened/closed by the second intake cam, the profiles of the first and the second intake cams being set such that the angle width of the open valve period of the intake valve opened by the second intake cam becomes an angle width that is smaller than an angle width between a top dead center and a bottom dead center and the angle width of the open valve period of the intake valve opened by the first intake cam becomes an angle width that is closer to the angle width between the top dead center and the bottom dead center than the angle width of the open valve period of the intake valve opened by the second intake cam, and the profiles of the first and the second intake cams being also set such that, in the case where the intake valve is opened/closed by the first intake cam and in the case where the intake valve is opened/closed by the second intake cam, the amounts of air charged into the combustion chamber of the internal combustion engine during the open valve period of the intake valve opened by the respective intake cams or the effective compression ratios of the combustion chamber agree with each other in both cases in a specific state in which the phase angle of the first intake cam and the phase angle of the second intake cam are controlled such that a phase angle at a start of opening of the intake valve by the first intake cam agrees with a phase angle at a valve opening start on a predetermined first lag angle side, which is on a lag angle side relative to the top dead center but on a lead angle side relative to the bottom dead center and that a phase angle at a start of opening of the intake valve by the second intake cam agrees with a phase angle at a valve opening start on a predetermined second lag angle side, which is on the lag angle side relative to the top dead center but on the lead angle side relative to the bottom dead center, an intake cam switching control unit, which defines the first intake cam out of the first and the second intake cams as the intake cam for a high-load operation of the internal combustion engine and defines the second intake cam as the intake cam for a low-load operation of the internal combustion engine, and controls the valve lift changing mechanism to switch the actively driving intake cam according to the load on the internal combustion engine; and a cam phase control unit, which controls the valve phase changing mechanism to change the phase angle of the actively driving intake cam according to the load on the internal combustion engine at the time of opening/closing the intake valve by each of the first and the second intake cams, wherein the cam phase control unit controls the valve phase changing mechanism such that, at the time of opening/closing the intake valve by the first intake cam, the phase angle at the start of opening of the intake valve changes in a lead angle direction within a range between a predetermined first lead-angle-side valve opening start phase angle on a lead angle side relative to the first lag-angle-side valve opening start phase angle and the first lag-angle-side valve opening start phase angle as the load on the internal combustion engine increases, and also controls the valve phase changing mechanism such that, at the time of opening/closing the intake valve by the second intake cam, the phase angle at the start of opening of the intake valve changes in a lag angle direction within a range between a predetermined second lead-angle-side valve opening start phase angle on a lead angle side relative to the second lag-angle-side valve opening start phase angle and the second lag-angle-side valve opening start phase angle as the load on the internal combustion engine increases, the intake cam switching control unit switches the actively driving intake cam in the specific state, the first lag-angle-side valve opening start phase angle and the first lead-angle-side valve opening start phase angle are set beforehand such that, in the case where the intake valve is opened/closed by the first intake cam, the amount of air charged into the combustion chamber of the internal combustion engine during the open valve period of the intake valve or the effective compression ratio of the combustion chamber increases as the phase angle at the opening start of the intake valve changes in the lead-angle direction within the range between the first lag-angle-side valve opening start phase angle and the first lead-angle-side valve opening start phase angle, and the second lag-angle-side valve opening start phase angle and the second lead-angle-side valve opening start phase angle are set beforehand such that, in the case where the intake valve is opened/closed by the second intake cam, the amount of air charged into the combustion chamber of the internal combustion engine during the open valve period of the intake valve or the effective compression ratio of the combustion chamber increases as the phase angle at the opening start of the intake valve changes in the lag angle direction within the range between the second lag-angle-side valve opening start phase angle and the second lead-angle-side valve opening start phase angle (a first aspect of the invention).

In the present invention, the phase angle of the first intake cam or the second intake cam, or the phase angle at the valve opening start or the valve opening end of the intake valve means a phase angle relative to a phase angle (rotational angle position) of the crankshaft (output shaft) of the internal combustion engine, that is, a relative angle indicated using a certain rotational angle position of the crankshaft (e.g., a rotational angle position corresponding to a top dead center or a bottom dead center of a piston) as the reference. The angle width of the open valve period of the intake valve means the difference between the phase angle at the valve opening start and the phase angle at the valve opening end.

Further, the effective compression ratio of the combustion chamber of the internal combustion engine means the ratio of the total volume of the combustion chamber of the internal combustion engine (the volume of each cylinder) at the valve opening end of the intake valve with respect to the total volume of the combustion chamber at the top dead center.

The above definitions of the meanings will apply to a second aspect through a fourth aspect of the invention, which will be discussed hereinafter.

According to the first aspect of the invention, when the intake valve is opened/closed by the second intake cam serving as the intake cam for the low-load operation of the internal combustion engine, the valve phase changing mechanism is controlled such that the phase angle at the valve opening start of the intake valve by the second intake cam changes in the lag angle direction within the range between the second lag-angle-side valve opening start phase angle and the second lead-angle-side valve opening start phase angle as the load on the internal combustion engine increases.

In this case, the angle width of the open valve period of the intake valve opened by the second intake cam is smaller than an angle width between the top dead center and the bottom dead center, namely, 180 degrees, thus making it possible to set the phase angle at the valve opening end of the intake valve to be a phase angle on the lead angle side relative to the bottom dead center. This permits the Atkinson-cycle (Miller-cycle) operation of the internal combustion engine, in which the effective compression ratio is smaller than an expansion ratio when the intake valve is opened/closed by the second intake cam.

Further, properly setting the second lag-angle-side valve opening start phase angle and the second lead-angle-side valve opening start phase angle makes it possible to increase the amount of air charged into the combustion chamber of the internal combustion engine during the open valve period of the intake valve (hereinafter referred to, in some cases, simply as the amount of air charged into the combustion chamber) or the effective compression ratio of the combustion chamber while at the same time moving the phase angle at the opening end of the intake valve from the lead angle side toward a phase angle at the bottom dead center as the phase angle at the start of opening of the intake valve by the second intake cam is changed in the lag angle direction from the second lead-angle-side valve opening start phase angle to the second lag-angle-side valve opening start phase angle (to consequently change the whole open valve period of the intake valve in the lag angle direction). As a result, the amount of air charged into the combustion chamber of the internal combustion engine or the effective compression ratio thereof can be increased as the load on the internal combustion engine increases.

Further, the valve phase changing mechanism is controlled such that, at the time of opening/closing the intake valve by the first intake cam serving as the intake cam for the high-load operation of the internal combustion engine, the phase angle at the start of the opening of the intake valve by the first intake cam is changed in the lead angle direction within a range between the first lag-angle-side valve opening start phase angle and the first lead-angle-side valve opening start phase angle as the load on the internal combustion engine increases.

In this case, the angle width of the open valve period of the intake valve by the first intake cam is larger than the angle width of the open valve period of the intake valve opened by the second intake cam, thus making it possible to set the phase angle at the valve opening end of the intake valve to be a phase angle on the lag angle side relative to the bottom dead center. This permits the Atkinson-cycle (Miller-cycle) operation of the internal combustion engine, in which the effective compression ratio is smaller than an expansion ratio when the intake valve is opened/closed by the first intake cam.

Further, properly setting the first lag-angle-side valve opening start phase angle and the first lead-angle-side valve opening start phase angle makes it possible to increase the amount of air charged into the combustion chamber of the internal combustion engine or the effective compression ratio thereof while at the same time moving the phase angle at the opening end of the intake valve from the lag angle side toward the phase angle at the bottom dead center as the phase angle at the opening start of the intake valve by the first intake cam is changed in the lead angle direction from the first lag-angle-side valve opening start phase angle to the first lead-angle-side valve opening start phase angle (to eventually change the whole open valve period of the intake valve in the lead angle direction). As a result, the amount of air charged into the combustion chamber of the internal combustion engine or the effective compression ratio thereof can be increased as the load on the internal combustion engine increases.

Further, according to the first aspect of the invention, the intake cam switching control unit switches the actively driving intake cam in the aforesaid specific state. The phase angle at the start of opening of the intake valve by the second intake cam in the specific state is a phase angle on a maximum lag angle side in the range between the second lead-angle-side valve opening start phase angle and the second lag-angle-side valve opening start phase angle (i.e., the second lag-angle-side valve opening start phase angle). The phase angle at the start of opening of the intake valve by the first intake cam in the specific state is a phase angle on the maximum lag angle side in the range between the first lead-angle-side valve opening start phase angle and the first lag-angle-side valve opening start phase angle (i.e., the first lag-angle-side valve opening start phase angle).

In the specific state, the amount of air charged into the combustion chamber of the internal combustion engine or the effective compression ratio thereof when the intake valve is opened/closed by the first intake cam coincides with that when the intake valve is opened/closed by the second intake cam.

Therefore, the actively driving intake cam can be promptly switched without causing a sudden change in the phase angle of each intake cam in the specific state while the load on the internal combustion engine is increasing or decreasing. In addition, a discontinuous change in the amount of air charged into the combustion chamber of the internal combustion engine can be restrained before and after the switching. This consequently restrains fluctuations in an output torque of the internal combustion engine.

Further, the phase angle at the start of the opening of the intake valve when the actively driving intake cam is switched, namely, the first lag-angle-side valve opening start phase angle or the second delay-angle-side valve opening start phase angle, is a phase angle between the top dead center and the bottom dead center, thus obviating a sudden change in the amount of an exhaust gas (an exhaust gas recirculated by an EGR apparatus) charged together with air into the combustion chamber during the open valve period of the intake valve before and after the actively driving intake cam is switched. Consequently, the occurrence of a misfire can be restrained.

According to the first aspect of the present invention, therefore, the switching of the intake cams can be accomplished while restraining fluctuations in the outputs of the internal combustion engine or the occurrence of misfires. Moreover, the amount of air charged into the combustion chamber or the effective compression ratio thereof can be increased or decreased as the load on the internal combustion engine increases or decreases. Thus, a change in the opening degree of the throttle valve of the internal combustion engine attributable to a change in the load on the internal combustion engine can be reduced and a large opening degree of the throttle valve can be maintained over a wide range of the load on the internal combustion engine. As a result, higher thermal efficiency of the internal combustion engine can be achieved with a resultant restrained fuel consumption.

In the first aspect of the invention, the first lag-angle-side valve opening start phase angle and the second lag-angle-side valve opening start phase angle may be of course different, or may share the same phase angle. Similarly, the first lead-angle-side valve opening start phase angle and the second lead-angle-side valve opening start phase angle may be different or the same.

Further, the inventors of the present application have found that, in the first aspect of the invention described above, the following construction is preferably adopted in order to run the internal combustion engine with maximized thermal efficiency.

The specific state is a state in which the effective compression ratio of the combustion chamber of the internal combustion engine in the case where an intake valve is opened/closed by the first intake cam in the specific state coincides with that in the case where the intake valve is opened/closed by the second intake cam in the specific state, and in the case where: a ratio ($=\eta/\eta 0$) obtained by dividing a thermal efficiency $\eta$ of the internal combustion engine, which is obtained in the case where the internal combustion engine is operated at an effective compression ratio of an arbitrary value of the combustion chamber of the internal combustion engine implemented by opening/closing the intake valve by the first intake cam or the second intake cam, by a thermal efficiency $\eta 0$ of the internal combustion engine obtained in the case where the internal combustion engine is operated at Otto cycle while charging air of the same amount as the amount of air, which is charged into the combustion chamber on the basis of the effective compression ratio, into the combustion chamber, is defined as a relative thermal efficiency of the internal combustion engine; a value of an effective compression ratio at which the relative thermal efficiency reaches a maximum value in a first relative thermal efficiency characteristic, which is a characteristic of a change in a relative thermal efficiency of the internal combustion engine in response to a change in an effective compression ratio implemented in the case where the phase angle of the first intake cam is changed such that the phase angle at an opening end of the intake valve changes on a lag angle side relative to the bottom dead center while opening/closing the intake valve by the first intake cam, is defined as a first effective compression ratio; and a value of the effective compression ratio at which the relative thermal efficiency reaches a maximum value in a second relative thermal efficiency characteristic, which is a characteristic of a change in a relative thermal efficiency of the internal combustion engine with respect to a change in an effective compression ratio implemented in the case where the phase angle of the first intake cam is changed such that the phase angle at an opening end of the intake valve changes on a lead angle side relative to the bottom dead center while opening/closing the intake valve by the second intake cam, is defined as a second effective compression ratio; the first lag-angle-side valve opening start phase angle and the second lead-angle-side valve opening start phase angle are preferably set such that an effective compression ratio at the time of cam switching, which is the effective compression ratio in the case where the intake valve is opened/closed by either the first intake cam or the second intake cam in the specific state, becomes a compression ratio of a magnitude between the first effective compression ratio and the second effective compression ratio (a second aspect of the invention).

The operation of the internal combustion engine at the Otto cycle is an operation in which the air charged into the combustion chamber of the internal combustion engine is compressed at a compression ratio that coincides with an expansion ratio (the ratio of a volume in the combustion chamber at the bottom dead center with respect to the whole volume of the combustion chamber at the top dead center).

According to the present invention, the phase angle of the actively driving intake cam is changed and the actively driving intake cam is switched as the load on the internal combustion engine increases. Further, according to various experiments and studies performed by the inventors of the present application, when the case where the phase angle of the first intake cam is changed such that the phase angle at the opening end of the intake valve changes to be a phase angle on the lag angle side relative to the bottom dead center while opening/closing the intake valve by the first intake cam (hereinafter referred to "the case of late closing of the intake valve" in some cases) is compared with the case where the phase angle of the first intake cam is changed such that the phase angle at the opening end of the intake valve changes to be a phase angle on the lead angle side relative to the bottom dead center while opening/closing the intake valve by the second intake cam (hereinafter referred to "the case of early closing of the intake valve" in some cases), the relative thermal efficiency of the internal combustion engine tends to be relatively higher in the case of early closing of the intake valve than in the case of late closing of the intake valve during an operation of the internal combustion engine in which the effective compression ratio of the combustion chamber of the internal combustion engine is relatively small (a low-load operation mode).

Conversely, the relative thermal efficiency of the internal combustion engine tends to be relatively higher in the case of late closing of the intake valve than in the case of early closing of the intake valve during an operation of the internal combustion engine in which the effective compression ratio of the combustion chamber of the internal combustion engine is relatively large (a high-load operation mode).

Thus, by setting the first lag-angle-side valve opening start phase angle and the second lead-angle-side valve opening start phase angle such that the effective compression ratio at the time of cam switching becomes a compression ratio of an appropriate intermediate magnitude between the first effective compression ratio and the second effective compression ratio, an intake valve can be closed as late as possible (the phase angle at the opening end of the intake valve being on the lag angle side relative to the bottom dead center) by using mainly the first intake cam as the actively driving intake cam in a load region in which the relative thermal efficiency of the internal combustion engine is higher in the case of the early closing of the intake valve than in the case of the late closing of the intake valve.

Conversely, an intake valve can be closed as early as possible (the phase angle at the opening end of the intake valve being on the lead angle side relative to the bottom dead center) by using mainly the second intake cam as the actively driving intake cam in a load region in which the relative thermal efficiency of the internal combustion engine is higher in the case of the late closing of the intake valve than in the case of the early closing of the intake valve.

Thus, the internal combustion engine can be run to obtain high thermal efficiency of the internal combustion engine in a variety of load conditions of the internal combustion engine.

According to the second aspect of the invention, therefore, the intake cams can be switched so as to enable the internal combustion engine to be run at high thermal efficiency while restraining fluctuations in the output of the internal combustion engine and the occurrence of misfires. This permits further improved thermal efficiency of the internal combustion engine and restrained fuel consumption.

In the second aspect of the invention, the first lag-angle-side valve opening start phase angle and the second lead-angle-side valve opening start phase angle are preferably set such that the value of a relative thermal efficiency corresponding to the effective compression ratio at the time of cam switching in the first relative thermal efficiency characteristic and the value of a relative thermal efficiency corresponding to the effective compression ratio at the time of cam switching in the second relative thermal efficiency characteristic agree with each other (a third aspect of the invention).

In this case, the agreement between the value of a relative thermal efficiency corresponding to the effective compression ratio at the time of cam switching in the first relative thermal efficiency characteristic and the value of a relative thermal efficiency corresponding to the effective compression ratio at the time of cam switching in the second relative thermal efficiency characteristic does not only mean that the values of the two relative thermal efficiencies are precisely identical but also includes a case where the difference between the values of the two relative thermal efficiencies is sufficiently small.

The first lag-angle-side valve opening start phase angle and the second lead-angle-side valve opening start phase angle set as described above makes it possible to prevent an intake valve from being opened/closed in the late closing mode by using the first intake cam as the actively driving intake cam when the relative thermal efficiency of the internal combustion engine becomes higher in the case of the early closing of the intake valve than in the case of the late closing in a region of some effective compression ratios in the vicinity of the effective compression ratio at the time of cam switching. It is also possible to prevent an intake valve from being opened/closed in the early closing mode by using the second intake cam as the actively driving intake cam when the relative thermal efficiency of the internal combustion engine becomes higher in the case of the late closing of the intake valve than in the case of the early closing.

With this arrangement, the internal combustion engine can be run at high thermal efficiency in a wide load range of the internal combustion engine.

To fulfill the aforesaid object, a second aspect of the present invention provides a controller for an internal combustion engine including: an intake valve driving mechanism that has a first intake cam and a second intake cam selectively used to open/close an intake valve; a valve lift changing mechanism that selectively switches an actively driving intake cam, which is an intake cam actually opening/closing the intake valve to either the first intake cam or the second intake cam; and a valve phase changing mechanism that changes the phase angles of the first and the second intake cams relative to the phase angle of a crankshaft, the profiles of the first and the second intake cams being set such that, in the case where the intake valve is opened/closed by the first intake cam, the lift amount of the intake valve and the angle width of an open valve period are both larger than those in the case where the intake valve is opened/closed by the second intake cam, the profiles of the first and the second intake cams being set such that the angle width of the open valve period of the intake valve opened by the first intake cam is an angle width that is larger than an angle width between a top dead center and a bottom dead center and the angle width of the open valve period of the intake valve opened by the second intake cam is an angle width that is closer to an angle width between a top dead center and a bottom dead center than the angle width of the open valve period of the intake valve opened by the first intake cam, and the profiles of the first and the second intake cams being set such that, in the case where the intake valve is opened/closed by the first intake cam and in the case where the intake valve is opened/closed by the second intake cam, the amounts of air charged into the combustion chamber of the internal combustion engine during the open valve period of the intake valve opened by the respective intake cams or the effective compression ratios of the combustion chamber agree with each other in both cases in a specific state in which the phase angle of the first intake cam and the phase angle of the second intake cam are controlled such that a phase angle at a start of the opening of the intake valve by the first intake cam and a phase angle at a start of the opening of the intake valve by the second intake cam agree with each other at a predetermined lead-angle-side valve opening start phase angle that is on the lead angle side from the phase angle at the top dead center, an intake cam switching control unit, which defines the first intake cam out of the first and the second intake cams as the intake cam for a low-load operation of the internal combustion engine and defines the second intake cam as the intake cam for a high-load operation of the internal combustion engine, and controls the valve lift changing mechanism to switch the actively driving intake cam according to the load on the internal combustion engine; and a cam phase control unit, which controls the valve phase changing mechanism to change the phase angle of the actively driving intake cam according to the load on the internal combustion engine at the time of opening/closing the intake valve by each of the first and the second intake cams, wherein the cam phase control unit controls the valve phase changing mechanism such that, at the time of opening/closing the intake valve by the first intake cam, the phase angle at the start of the opening of the intake valve changes in a lead-angle direction within a range between the lead-angle-side valve opening start phase angle and a predetermined first lag-angle-side valve opening start phase angle closer to a lag angle end than the lead-angle-side valve opening start phase angle as the load on the internal combustion engine increases, and also controls the valve phase changing mechanism such that, at the time of opening/closing the intake valve by the second intake cam, the phase angle at the start of the opening of the intake valve changes in a lag angle direction within a range between the lead-angle-side valve opening start phase angle and a predetermined second lag-angle-side valve opening start phase angle closer to an lag angle end than the lead-angle-side valve opening start phase angle as the load on the internal combustion engine increases, the intake cam switching control unit switches the actively driving intake cam in the specific state, the lead-angle-side valve opening start phase angle and the first lag-angle-side valve opening start phase angle are set beforehand such that, in the case where the intake valve is opened/closed by the first intake cam, the amount of air charged into the combustion chamber of the internal combustion engine during the open valve period of the intake valve or the effective compression ratio of the combustion chamber increases as the phase angle at the opening start of the intake valve changes in the lead-angle direction within the range between the lead-angle-side valve opening start phase angle and the first lag-angle-side valve opening start phase angle, and the lead-angle-side valve opening start phase angle and the second lag-angle-side valve opening start phase angle are set beforehand such that, in the case where the intake valve is opened/closed by the second intake cam, the amount of air charged into the combustion chamber of the internal combustion engine during the open valve period of the intake valve or the effective compression ratio of the combustion chamber increases as the phase angle at the opening start of the intake valve changes in the lag angle direction within the range between the lead-angle-side valve opening start phase angle and the second lag-angle-side valve opening start phase angle (a fourth aspect of the invention).

According to the fourth aspect of the invention, when the intake valve is opened/closed by the first intake cam serving as the intake cam for the low-load operation of the internal combustion engine, the valve phase changing mechanism is controlled such that the phase angle at the valve opening start of the intake valve by the first intake cam changes in the lead angle direction within the range between the lead-angle-side valve opening start phase angle and the first lag-angle-side valve opening start phase angle as the load on the internal combustion engine increases.

In this case, the angle width of the open valve period of the intake valve opened by the first intake cam is larger than an angle width between the top dead center and the bottom dead center, namely, 180 degrees, thus making it possible to set the phase angle at the valve opening end of the intake valve to be a phase angle on the lag angle side relative to the bottom dead center. This permits the Atkinson-cycle (Miller-cycle) operation of the internal combustion engine, in which the effective compression ratio is smaller than an expansion ratio when the intake valve is opened by the first intake cam.

Further, properly setting the lead-angle-side valve opening start phase angle and the first lag-angle-side valve opening start phase angle makes it possible to increase the amount of air charged into the combustion chamber of the internal combustion engine during the open valve period of the intake valve (the amount of air charged into the combustion chamber) or the effective compression ratio of the combustion chamber while at the same time moving the phase angle at the opening end of the intake valve from the lag angle side toward a phase angle at the bottom dead center as the phase angle at the opening start of the intake valve opened by the first intake cam is changed in the lead angle direction from the first lag-angle-side valve opening start phase angle to the lead-angle-side valve opening start phase angle (to consequently change the whole open valve period of the intake valve in the lead angle direction). As a result, the amount of air charged into the combustion chamber of the internal combustion engine or the effective compression ratio thereof can be increased as the load on the internal combustion engine increases.

Further, the valve phase changing mechanism is controlled such that, at the time of opening/closing the intake valve by the second intake cam serving as the intake cam for the high-load operation of the internal combustion engine, the phase angle at the start of the opening of the intake valve by the second intake cam is changed in the lag angle direction within a range between the lead-angle-side valve opening start phase angle and the second lag-angle-side valve opening start phase angle as the load on the internal combustion engine increases.

In this case, the angle width of the open valve period of the intake valve by the second intake cam is smaller than the angle width of the open valve period of the intake valve opened by the second intake cam, thus making it possible to set the phase angle at the valve opening end of the intake valve to be a phase angle on the lead angle side relative to the bottom dead center. This permits the Atkinson-cycle (Miller-cycle) operation of the internal combustion engine, in which the effective compression ratio is smaller than an expansion ratio when the intake valve is opened by the second intake cam.

Further, properly setting the lead-angle-side valve opening start phase angle and the second lag-angle-side valve opening start phase angle makes it possible to increase the amount of air charged into the combustion chamber of the internal combustion engine or the effective compression ratio thereof while at the same time moving the phase angle at the opening end of the intake valve from the lead angle side toward the phase angle at the bottom dead center as the phase angle at the opening start of the intake valve by the second intake cam is changed in the lag angle direction from the lead-angle-side valve opening start phase angle to the second lag-angle-side valve opening start phase angle (to eventually change the whole open valve period of the intake valve in the lag angle direction). As a result, the amount of air charged into the combustion chamber of the internal combustion engine or the effective compression ratio thereof can be increased as the load on the internal combustion engine increases.

Further, according to the fourth aspect of the invention, the intake cam switching control unit switches the actively driving intake cam in the aforesaid specific state. The phase angle at the opening start of the intake valve opened by the first intake cam in the specific state is a phase angle on the maximum lead angle side in the range between the lead-angle-side valve opening start phase angle and the first lag-angle-side valve opening start phase angle (i.e., the lead-angle-side valve opening start phase angle). The phase angle at the start of opening of the intake valve by the second intake cam in the specific state is a phase angle on the maximum lead angle side in the range between the lead-angle-side valve opening start phase angle and the second lag-angle-side valve opening start phase angle (i.e., the lead-angle-side valve opening start phase angle).

In the specific state, the amount of air charged into the combustion chamber of the internal combustion engine or the effective compression ratio thereof when the intake valve is opened/closed by the first intake cam coincides with that when the intake valve is opened/closed by the second intake cam.

Therefore, the actively driving intake cam can be promptly switched without causing a sudden change in the phase angle of each intake cam in the specific state while the load on the internal combustion engine is increasing or decreasing. In addition, a discontinuous change in the amount of air charged into the combustion chamber of the internal combustion engine can be restrained before and after the switching. This consequently restrains fluctuations in an output torque of the internal combustion engine.

Further, the phase angle at the start of the opening of the intake valve when the actively driving intake cam is switched, namely, the lead-angle-side valve opening start phase angle, does not change before and after the switching of the actively driving intake cam, thus obviating a sudden change in the amount of an exhaust gas (an exhaust gas recirculated by an EGR apparatus or the exhaust gas emitted discharged from the combustion chamber in an exhaust stroke immediately preceding an intake stroke) charged together with air into the combustion chamber during the open valve period of the intake valve before and after the actively driving intake cam is switched. Consequently, the occurrence of a misfire can be restrained.

According to the fourth aspect of the present invention, therefore, as with the first aspect of the invention, the switching of the intake cams can be accomplished while restraining fluctuations in the outputs of the internal combustion engine or the occurrence of misfires. Moreover, the amount of air charged into the combustion chamber or the effective compression ratio thereof can be increased or decreased as the load on the internal combustion engine increases or decreases. Thus, a change in the opening degree of the throttle valve of the internal combustion engine attributable to a change in the load on the internal combustion engine can be reduced and a large opening degree of the throttle valve can be maintained over a wide range of the load on the internal combustion engine. As a result, higher thermal efficiency of the internal combustion engine can be achieved with resultant restrained fuel consumption.

In the fourth aspect of the invention, the first lag-angle-side valve opening start phase angle and the second lag-angle-side valve opening start phase angle may be of course different, or may share the same phase angle.

DESCRIPTION OF THE PREFERRED EMBODIMENTS

First Embodiment

Figure 1:
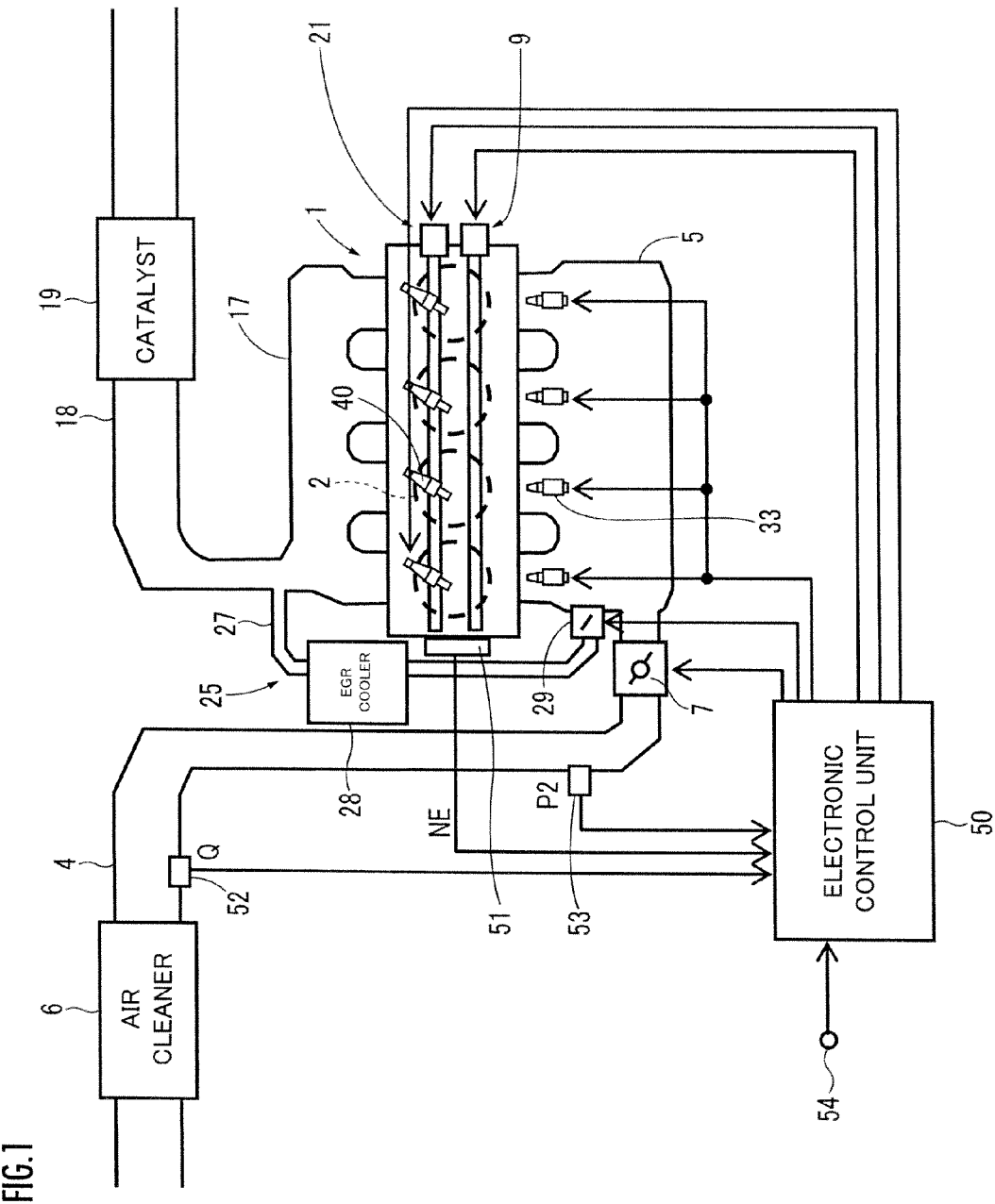
FIG. 1 is a diagram illustrating the configuration of an internal combustion engine and a system attached thereto in a first embodiment of the present invention.
Figure 2:
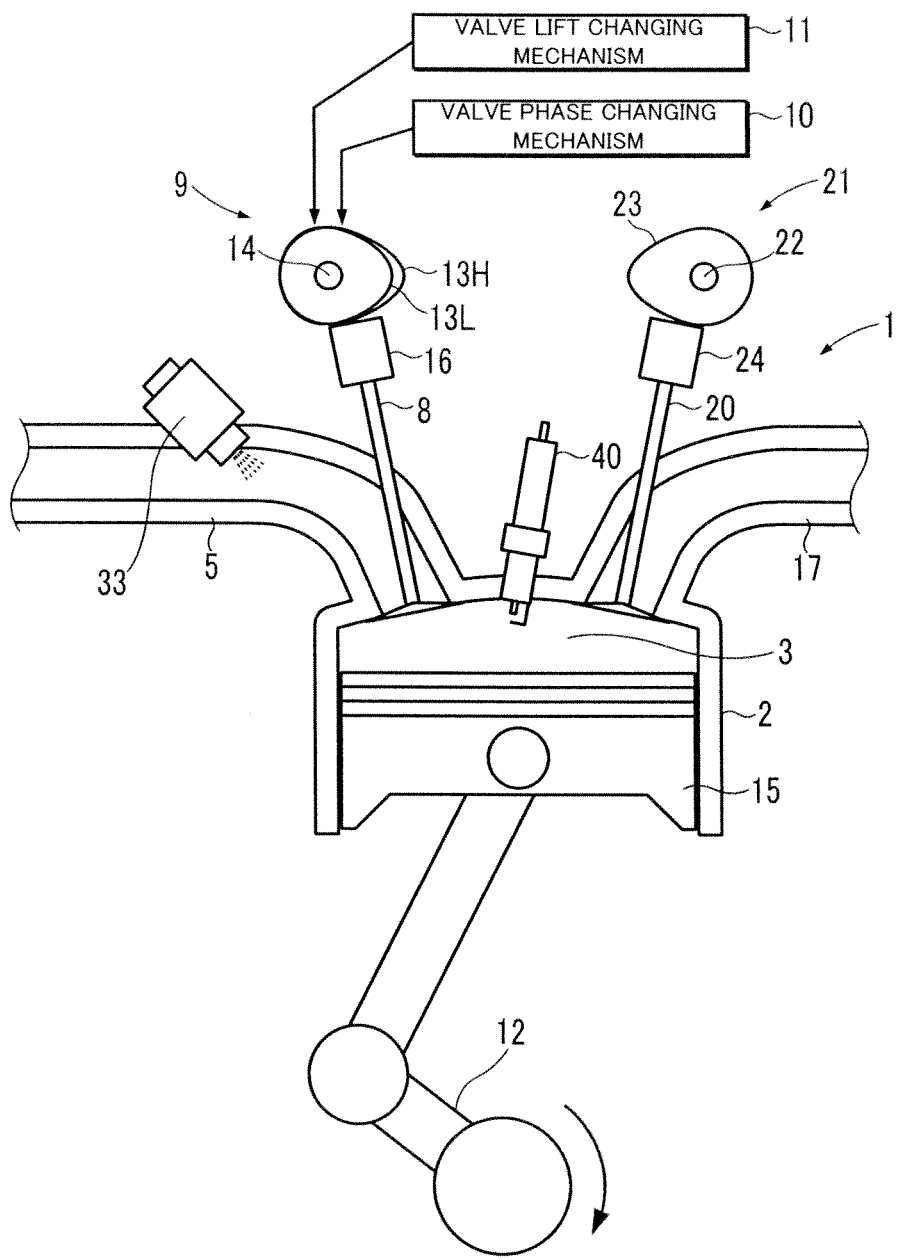
FIG. 2 is a schematic diagram illustrating the constructions related to an intake valve and an exhaust valve of the internal combustion engine shown in FIG. 1.

A first embodiment of the present invention will be described below. Referring to FIGS. 1 and 2, a system of the present embodiment has an internal combustion engine 1 mounted as a power source for a vehicle to travel and an electronic control unit 50 which controls the operation of the internal combustion engine 1.

The internal combustion engine 1 in the present embodiment is, for example, a four-cylinder internal combustion engine. However, the number of the cylinders of the internal combustion engine 1 does not have to be four. The internal combustion engine 1 may alternatively be, for example, a single-cylinder or a six-cylinder internal combustion engine.

An intake system of the internal combustion engine 1 is constructed to supply air (fresh air) to be mixed with a fuel burned in a combustion chamber 3 of each cylinder 2 into the combustion chamber 3 to the combustion chamber 3 of each cylinder 2 through the intermediary of an intake passage 4 shared by all cylinders 2 and an intake manifold 5, which is in communication with an intake port of the combustion chamber 3 of each cylinder 2 in this order.

In this case, the intake passage 4 is provided with an air cleaner 6, which removes undesired substances from the air (atmosphere) coming in from outside, and a throttle valve 7, which adjusts the flow of the air, which are installed in this order from the upstream side. The throttle valve 7 is an electrically-operated throttle valve and the opening degree thereof is controlled through the intermediary of an electric motor (not shown).

The internal combustion engine 1 is provided with an intake valve 8 for opening/closing the intake port of the combustion chamber 3 of each cylinder 2 and an intake valve driving mechanism 9 which opens/closes the intake valve 8.

According to the present embodiment, in order to accomplish the Atkinson-cycle (Miller-cycle) operation of the internal combustion engine 1, which makes it possible to variably control the effective compression ratio of the combustion chamber 3 of each cylinder 2 of the internal combustion engine 1, the intake valve driving mechanism 9 has a publicly known valve phase changing mechanism 10 (a mechanism so-called VTC) which changes the phase angle of the intake valve 8 in an open valve period and a publicly known valve lift changing mechanism 11 (a mechanism so-called VTEC (registered trademark)) which changes the lift amount (maxim opening degree) of the intake valve 8 and the angle width of the open valve period.

The angle width of the open valve period of the intake valve 8 is the open valve period from the start of the opening to the end of the opening of the intake valve 8, which is expressed in terms of the rotational angle width of the crankshaft 12, which is the output shaft of the internal combustion engine 1. In other words, the angle width of the open valve period of the intake valve 8 is the angle difference between the phase angle (the rotational angle position) of the crankshaft 12 at the start of opening of the intake valve 8 and the phase angle of the crankshaft 12 at the end of opening of the intake valve 8.

Further, the phase angle of the open valve period of the intake valve 8 means a phase angle that representatively indicates in which range of phase angle the entire open valve period of the crankshaft 12 exists and is expressed by, for example, the phase angle at the start of opening of the intake valve 8 (the phase angle of the crankshaft 12 at the start of valve opening) or the phase angle at the end of opening of the intake valve 8 (the phase angle of the crankshaft 12 at the end of valve opening).

The construction of the intake valve driving mechanism 9 will be schematically described, a detailed illustration thereof being omitted. Referring to FIG. 2, the intake valve driving mechanism 9 has the valve phase changing mechanism 10, the valve lift changing mechanism 11, and two intake cams 13L and 13H for each cylinder 2. The intake cams 13L and 13H are rotatably supported by a cam shaft 14 on the intake side such that they rotate together with the cam shaft 14 as one piece.

The profiles (shape patterns) of the intake cams 13L and 13H are set such that the pairs of the lift amount of the intake valve 8 and the angle width of the open valve period are different from each other.

The profiles of the intake cams 13L and 13H are set such that the lift amount and the angle width of the open valve period of the intake valve 8 by the intake cam 13H are larger than the lift amount and the angle width of the open valve period of the intake valve 8 by the intake cam 13L, as indicated by solid lines a and d in FIG. 3 (hereinafter, the intake cam 13H will be referred to as the large lift intake cam 13H, while the intake cam 13L will be referred to as the small lift intake cam 13L in some cases). The crank angle on the axis of abscissas in FIG. 3 means the phase angle of the crankshaft 12.

In this case, the angle width of the open valve period of the intake valve 8 by the large lift intake cam 13H is set to an angle width that is closer to the angle difference between the phase angle at the top dead center and the phase angle at the bottom dead center of a piston 15 of each cylinder 2 (=180 degrees) than the angle width of the open valve period of the intake valve 8 by the small lift intake cam 13L. More specifically, the angle width of the open valve period of the intake valve 8 by the large lift intake cam 13H is set to, for example, an angle width (e.g., approximately 190 degrees), which is slightly larger than the angle difference between the phase angle at the top dead center and the phase angle at the bottom dead center (=180 degrees).

The angle width of the open valve period of the intake valve 8 by the small lift intake cam 13L is set to, for example, approximately 100 degrees, which is smaller than the angle difference between the phase angle at the top dead center and the phase angle at the bottom dead center (=180 degrees).

The intake valve driving mechanism 9 is constructed such that an intake cam that actually drives the intake valve 8 through the intermediary of a rocker arm 16 (hereinafter referred to as the actively driving intake cam) is selectively switched to either the small lift intake cam 13L or the large lift intake cam 13H by the hydraulic valve lift changing mechanism 11. In this case, the small lift intake cam 13L is used as the intake cam for a low-load operation of the internal combustion engine 1, while the large lift intake cam 13H is used as the intake cam for a high-load operation of the internal combustion engine 1.

The valve lift changing mechanism 11 has a publicly known construction, such as the same construction disclosed in, for example, FIG. 2 of Japanese Patent Application Laid-Open No. 2005-180306. However, the valve lift changing mechanism 11 may have a different construction as long as it has a mechanism that allows the actively driving intake cam to be selectively switched to either the small lift intake cam 13L or the large lift intake cam 13H. Further, the valve lift changing mechanism 11 may be electrically operated rather than limited only to a hydraulic type.

The cam shaft 14 on the intake side, which rotatably supports the intake cams 13L and 13H, is rotationally supported by an oil chamber forming member (not shown) connected to the crankshaft 12 through the intermediary of a timing belt (not shown) such that the cam shaft 14 rotates as the crankshaft 12 of the internal combustion engine 1 rotates (the cam shaft 14 rotating once each time the crankshaft 12 rotates). The phase angle (angular position) of the intake-side cam shaft 14 relative to the oil chamber forming member in the direction of rotation of the oil chamber forming member can be changed within a predetermined angle range.

With this arrangement, the phase angle of the intake-side cam shaft 14, i.e., the phase angles of the small lift intake cam 13L and the large lift intake cam 13H, relative to the phase angle of the crankshaft 12, can be continuously changed within predetermined angle ranges.

The intake valve driving mechanism 9 is constructed to change the phase angle of the intake-side cam shaft 14 relative to the phase angle of the crankshaft 12, i.e., the phase angles of the small lift intake cam 13L and the large lift intake cam 13H relative to the phase angle of the crankshaft 12, by the hydraulic valve phase changing mechanism 10. This arrangement makes it possible to continuously change the phase angle of the open valve period of the intake valve 8 in a predetermined range by the small lift intake cam 13L and the large lift intake cam 13H, respectively, as illustrated in FIG. 3.

Figure 3:
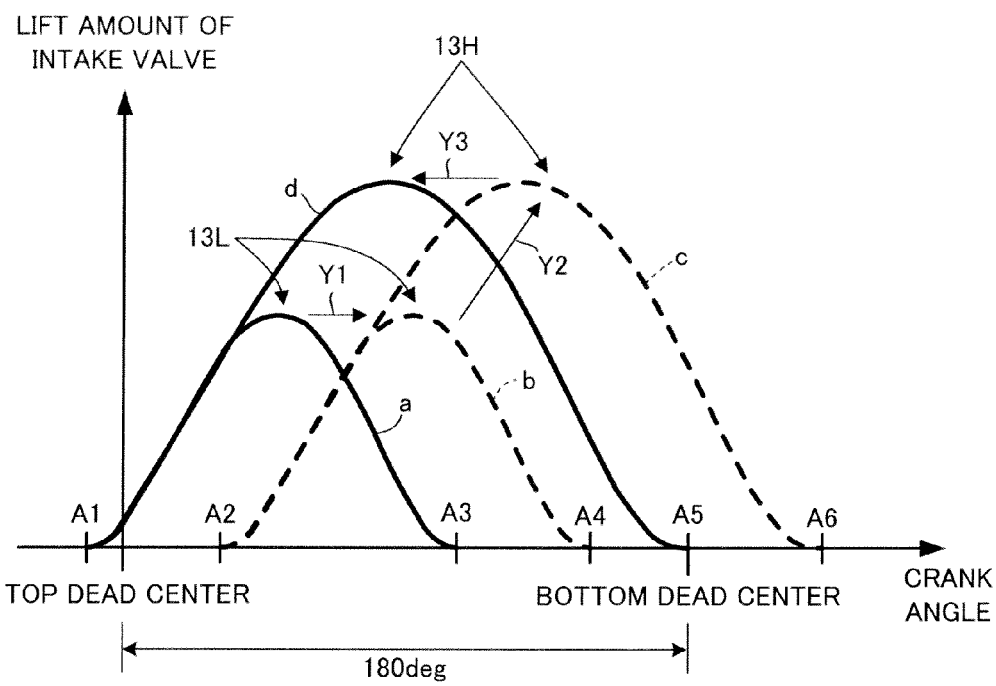
FIG. 3 is a graph illustrating the driving characteristics of the intake valve of the internal combustion engine shown in FIG. 1.

The valve phase changing mechanism 10 has a publicly known construction, such as the same construction disclosed in, for example, FIG. 3 of Japanese Patent Application Laid-Open No. 2005-180306. However, the valve phase changing mechanism 10 may have a different construction as long as it has a mechanism capable of continuously changing the phase angles of the small lift intake cam 13L and the large lift intake cam 13H relative to the phase angle of the crankshaft 12 within the predetermined range. Further, the valve phase changing mechanism 10 may be electrically operated rather than limited only to a hydraulic type.

The profiles of the intake cams 13L and 13H, the changes in the phase angles of the intake cams 13L and 13H, and the open valve patterns of the intake valve 8 implemented by switching between the intake cams 13L and 13H will now be described in further detail.

In the present embodiment, the intake cams 13L and 13H rotates integrally with the intake-side cam shaft 14, so that a constant mutual phase relationship between the intake cams 13L and 13H is maintained. This means that a constant mutual phase relationship in the open valve period of the intake valve 8 by each of the intake cams 13L and 13H is also maintained.

In the example of the present embodiment, the mutual phase relationship between the intake cams 13L and 13H is set such that the phase angle at the start of opening of the intake valve 8 by the intake cam 13L and the phase angle at the start of opening of the intake valve 8 by the intake cam by the intake cam 13H will be the same, as illustrated in FIG. 3. Alternatively, however, the phase angle at the start of opening of the intake valve 8 by the intake cam 13L and that by the intake cam 13H may be set to be different to a certain degree.

In the present embodiment, the phase angles of the intake cams 13L and 13H, i.e., the phase angles in the open valve period of the intake valve 8 by the intake cams 13L and 13H, change within the ranges of the states defined by solid lines a and d in FIG. 3 and the states defined by dashed lines b and c in FIG. 3.

The states indicated by solid lines a and d in FIG. 3 are the states in which the phase angles of the intake cams 13L and 13H have been controlled to a maximum lead angle end. In the example of the present embodiment, the phase angle at the start of opening of the intake valve 8 in the states is set to a predetermined phase angle A1 near the top dead center (in other words, a predetermined phase angle A1, the magnitude of the difference of which from the phase angle at the top dead center is sufficiently small, namely, a phase angle that coincides or substantially coincides with the phase angle at the top dead center). The phase angle A1 is, for example, an angle that is approximately 10 degrees toward the lead angle side from the phase angle at the top dead center.

Further, the angle width of the open valve period of the intake valve 8 by each of the intake cams 13L and 13H and the phase angle A1 at the start of opening of the intake valve 8 in the states defined by the solid lines a and d in FIG. 3 are set as described above, so that a phase angle A3 at the end of opening of the intake valve 8 in the state indicated by the solid line a in FIG. 3 related to the small lift intake cam 13L will be set to a phase angle closer to the lead angle end than the phase angle at the bottom dead center (a phase angle on the lead angle side by approximately 90 degrees from the phase angle at the bottom dead center).

Further, in the state indicated by the solid line d in FIG. 3 related to the large lift intake cam 13H, a phase angle A5 at the end of opening of the intake valve 8 will be set to a phase angle near the bottom dead center (in other words, a phase angle, the magnitude of the difference thereof from the phase angle at the bottom dead center is sufficiently small, namely, a phase angle that coincides or substantially coincides with the phase angle at the bottom dead center). The phase angle A5 in the example of the present embodiment is the same as the phase angle at the bottom dead center.

The states indicated by the dashed lines b and c in FIG. 3 are the states in which the phase angles of the intake cams 13L and 13H have been controlled to the maximum lag angle side. For both the intake cams 13L and 13H, a phase angle A2 at the start of the opening of the intake valve 8 in the states is set to a predetermined phase angle which is closer to the lag angle end than the phase angle at the top dead center and which is closer to the lead angle end than the bottom dead center.

According to the present embodiment, the phase angle A2 is set to the phase angle lagged by, for example, approximately 60 degrees from the phase angle A1 at the start of the opening of the intake valve 8 in the states indicated by the solid lines a and d in FIG. 3 (namely, the phase angle lagged by approximately 50 degrees from the top dead center).

Thus, in the state indicated by the dashed line c in FIG. 3 related to the large lift intake cam 13H, a phase angle A6 at the end of opening of the intake valve 8 is a phase angle closer to the lag angle end than the phase angle at the bottom dead center. In the state indicated by the dashed line b in FIG. 3 related to the small lift intake cam 13L, a phase angle A4 at the end of opening of the intake valve 8 is a phase angle on the lead angle side relative to the bottom dead center.

According to the present embodiment, the profiles of the intake cams 13L and 13H, the phase angles A1 and A2 at the start of opening of the intake valve 8, and the phase angles A3, A4, A5 and A6 at the end of opening of the intake valve 8 are set as described above. This arrangement makes it possible to variably set the amount of air to be charged into the combustion chamber 3 of each cylinder 2 in the open valve period of the intake valve 8 (the amount of air charged) or the effective compression ratio of the combustion chamber 3 by switching the actively driving intake cam, which opens/closes the intake valve 8, to the intake cam 13L or 13H by the valve lift changing mechanism 11 or by changing the phase angle of the intake cam 13L or 13H by the valve phase changing mechanism 10 thereby to change the valve opening pattern of the intake valve 8 as described above.

The effective compression ratio of the combustion chamber 3 is, to be more specific, the ratio of a total volume V_IVC of the combustion chamber 3 (air charge chamber) at the end of opening of the intake valve 8 of each cylinder 2 to a total volume V_TDC of the combustion chamber 3 (air charge chamber) at the top dead center of the piston 15 (=V_IVC/V_TDC).

The amount of air to be charged into the combustion chamber 3 is, to be more specific, the amount of air to be charged into the combustion chamber 3 during the open valve period of the intake valve 8 when conditions except the operating conditions of the intake valve 8, such as the opening degree of the throttle valve 7 and the atmospheric temperature, are fixed.

Figure 4:
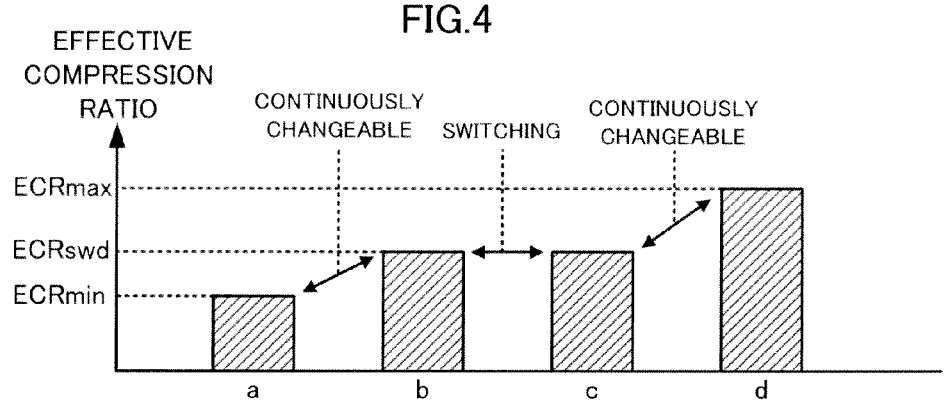
FIG. 4 is a diagram illustrating a phenomenon implemented by the driving characteristics of the intake valve shown in FIG. 3.

Further, in the case where, for example, the intake valve 8 is opened/closed by the small lift intake cam 13L, the amount of air charged into the combustion chamber 3 of each cylinder 2 or the effective compression ratio can be continuously increased, as illustrated in FIG. 4, by continuously changing the phase angle of the small lift intake cam 13L from the phase angle in the state indicated by the solid line a in FIG. 3 (the phase angle closest to a maximum lead angle end) toward the phase angle in the state indicated by the dashed line b (the phase angle closest to a maximum lag angle end).

More specifically, according to the present embodiment, when the intake valve 8 is opened/closed by the small lift intake cam 13L, the phase angle at the end of opening of the intake valve 8 changes from the phase angle closer to the lead angle side than the phase angle at the bottom dead center to the phase angle of the bottom dead center as the phase angle of the small lift intake cam 13L is changed from the lead angle side to the lag angle side. Thus, the Atkinson-cycle (Miller-cycle) operation of the internal combustion engine 1, in which the effective compression ratio becomes smaller than an expansion ratio, is achieved when the intake valve 8 is opened/closed by the small lift intake cam 13L. At the same time, as the phase angle of the small lift intake cam 13L is changed from the lead angle side to the lag angle side, the amount of air charged into the combustion chamber 3 of each cylinder 2 or the effective compression ratio increases.

Further, when the intake valve 8 is opened/closed by the large lift intake cam 13H, the amount of air charged into the combustion chamber 3 of each cylinder 2 or the effective compression ratio can be continuously increased by continuously changing the phase angle of the large lift intake cam 13H from the phase angle in the state indicated by the dashed line c in FIG. 3 (the phase angle closest to the maximum lag angle end) to the phase angle in the state indicated by the solid line d (the phase angle closest to the maximum lead angle end), as illustrated in FIG. 4.

More specifically, according to the present embodiment, when the intake valve 8 is opened/closed by the large lift intake cam 13H, the phase angle at the end of opening of the intake valve 8 changes from the phase angle closer to the lag angle side than the phase angle at the bottom dead center to the phase angle at the bottom dead center as the phase angle of the large lift intake cam 13H is changed from the lag angle side to the lead angle side. Thus, the Atkinson-cycle (Miller-cycle) operation of the internal combustion engine 1, in which the effective compression ratio becomes smaller than an expansion ratio, is achieved also when the intake valve 8 is opened/closed by the large lift intake cam 13H. At the same time, as the phase angle of the large lift intake cam 13H is changed from the lag angle side to the lead angle side, the amount of air charged into the combustion chamber 3 of each cylinder 2 or the effective compression ratio increases.

According to the present embodiment, in the state indicated by the solid line d in FIG. 3, the opening start and the opening end of the intake valve 8 will have substantially the same phase angles as those at the top dead center and the bottom dead center, respectively. In this state, an Otto-cycle operation of the internal combustion engine 1, in which the effective compression ratio is substantially the same as the expansion ratio, is implemented.

To supplementarily describe the relationship between the amount of air to be charged and the effective compression ratio of the combustion chamber 3 of each cylinder 2, the amount of air to be charged into the combustion chamber 3 is substantially proportional to the effective compression ratio, and the amount of air to be charged increases as the effective compression ratio increases.

Figure 5A:
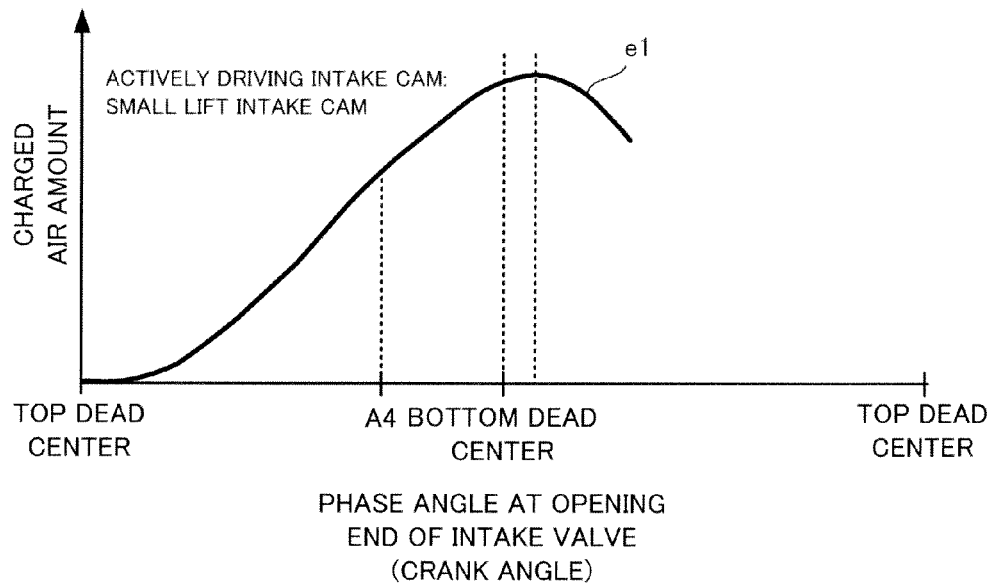
FIG. 5(a) and FIG. 5(b) are graphs illustrating the relationships between the phase angle at an opening end of the intake valve and the amount of air charged into the combustion chamber of each cylinder of the internal combustion engine shown in FIG. 1.

Therefore, when the intake valve 8 is opened/closed by the small lift intake cam 13L, if the phase angle at the end of opening of the intake valve 8 is changed by changing the phase angle of the small lift intake cam 13L, then the amount of air charged into the combustion chamber 3 will change, as illustrated by a curve e1 in FIG. 5(a).

Figure 5B:
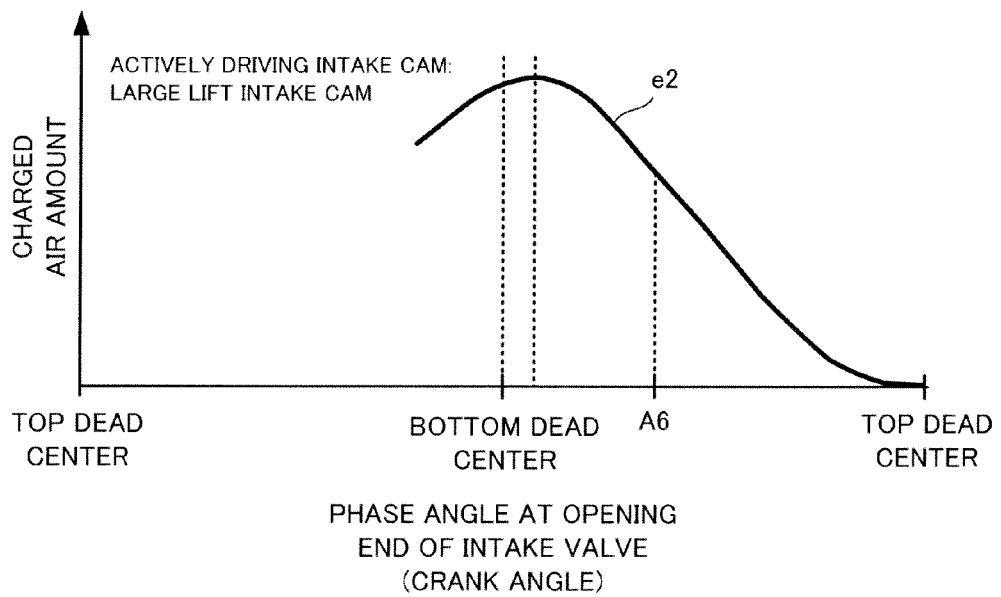

Further, when the intake valve 8 is opened/closed by the large lift intake cam 13H, if the phase angle at the end of opening of the intake valve 8 is changed by changing the phase angle of the large lift intake cam 13H, then the amount of air charged into the combustion chamber 3 will change, as illustrated by a curve e2 in FIG. 5(b).

Thus, the amount of air to be charged into the combustion chamber 3 can be increased or decreased as the phase angle of the actively driving intake cam (the small lift intake cam 13L or the large lift intake cam 13H) is changed to increase or decrease the effective compression ratio of the combustion chamber 3 of each cylinder 2.

In both cases illustrated in FIGS. 5(a) and 5(b), the amount of air to be charged into the combustion chamber 3 reaches a maximum amount of air when the phase angle at the end of opening of the intake valve 8 is slightly closer to the lag angle side than the phase angle at the bottom dead center (the phase angle at which the effective compression ratio reaches a maximum value) due to the influence of the inertia of an airflow coming into the combustion chamber 3. Further, the maximum amount of air in both cases illustrated in FIGS. 5(a) and 5(b) will be substantially the same.

According to the present embodiment, the profiles of the intake cams 13L and 13H are set such that the charged air amount of the combustion chamber 3 of each cylinder 2 or the effective compression ratio will be the same or substantially the same in both the case where the small lift intake cam 13L is used as the actively driving intake cam and the case where the large lift intake cam 13H is used as the actively driving intake cam in a state wherein the phase angles of the intake cams 13L and 13H are controlled to be the phase angles closest to the maximum lag angle end, i.e., the state wherein the open valve periods of the intake valve 8 actuated by the intake cams 13L and 13H are the open valve periods indicated by the dashed lines b and c in FIG. 3.

Hence, the effective compression ratio of the combustion chamber 3 of each cylinder 2 or the amount of air charged into the combustion chamber 3 can be maintained at a constant level or a substantially constant level at the time of switching the actively driving intake cam by switching the actively driving intake cam from one of the intake cams 13L and 13H to the other in the state wherein the phase angles of the intake cams 13L and 13H have been controlled to the phase angles to a maximum lag angle end, which corresponds to the states indicated by the dashed lines b and c in FIG. 3.

A higher effective compression ratio can be achieved in the case where the large lift intake cam 13H is used, as compared with the case where the small lift intake cam 13L is used. For this reason, the small lift intake cam 13L is used as the actively driving intake cam for the low-load operation of the internal combustion engine 1, while the large lift intake cam 13H is used as the actively driving intake cam for the high-load operation of the internal combustion engine 1.

Returning to the description related to FIG. 1, an exhaust system of the internal combustion engine 1 is constructed to emit an exhaust gas, which is generated in the combustion chamber 3 of each cylinder 2, through an exhaust manifold 17, which is in communication with an exhaust port of the combustion chamber 3 of each cylinder 2, and an exhaust passage 18, which is shared by all the cylinders 2, in this order. In this case, the exhaust passage 18 is provided with a catalyst 19 for purifying the exhaust gas.

Further, an exhaust valve 20 for opening/closing the exhaust port of the combustion chamber 3 of each cylinder 2 and an exhaust valve driving mechanism 21, which opens/closes the exhaust valve 20, are attached to the internal combustion engine 1.

The exhaust valve driving mechanism 21 has an exhaust cam 23 for each cylinder 2. The exhaust cam 23 is rotatably supported by a cam shaft 22 adjacent to the exhaust end such that the exhaust cam 23 rotates integrally with the cam shaft 22, which rotates as the crankshaft 12 of the internal combustion engine 1 rotates, the cam shaft 22 rotating once as the crankshaft 12 rotates twice. The exhaust valve driving mechanism 21 opens/closes the exhaust valve 20 by the exhaust cam 23 through the intermediary of a rocker arm 24.

Figure 6:
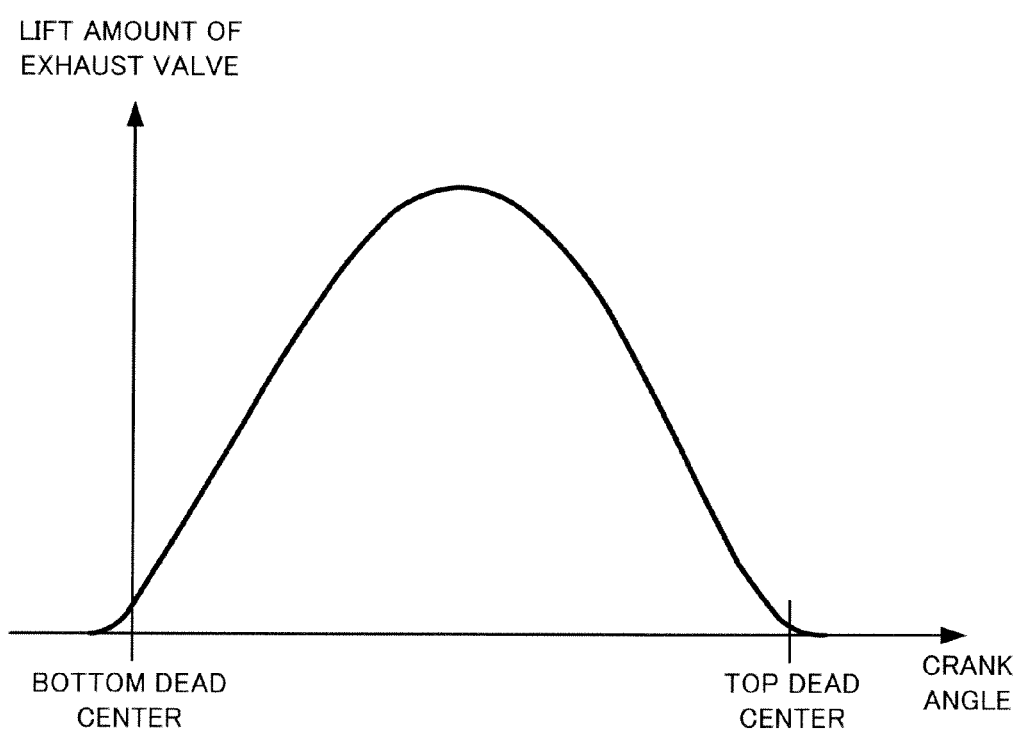
FIG. 6 is a graph illustrating the driving characteristics of the exhaust valve of the internal combustion engine shown in FIG. 1.

In this case, the profile (shape pattern) of the exhaust cam 23 is set such that the open valve period and the lift amount of the exhaust valve 20 defined thereby take a pattern shown in, for example, FIG. 6. According to the pattern, the angle width of the open valve period of the exhaust valve 20 is set to be slightly larger than the angular difference between the phase angle at the bottom dead center and the phase angle at the top dead center of the piston 15 of each cylinder 2 (180 degrees). Further, the phase angle at the start of opening of the exhaust valve 20 is set to be slightly closer to the lead angle side than the phase angle at the bottom dead center, while the phase angle at the end of opening thereof is set to be slightly closer to the lag angle side than the phase angle at the top dead center.

The intake system and the exhaust system of the internal combustion engine 1 constructed as described above are further provided with an EGR unit 25.

The EGR unit 25 recirculates a part of an exhaust gas to the intake side and supplies the recirculated exhaust gas together with air (fresh air to be mixed with a fuel) into the combustion chamber 3 of each cylinder 2. The EGR unit 25 has an EGR passage 27 (a passage of a recirculated exhaust gas), which is branched from an upstream end of the exhaust passage 18 (in the vicinity of the connection with the exhaust manifold 17) and merged with the intake manifold 5.

The EGR passage 27 is provided with an EGR cooler 28, which serves as an exhaust gas cooling means for cooling the exhaust gas to be recirculated to the intake side, and an electric or electromagnetic flow control valve 29 for controlling the flow rate of the exhaust gas (hereinafter referred to as the EGR valve 29). An EGR ratio (the ratio of the amount of an exhaust gas to the total amount of air supplied to the combustion chamber 3 and the exhaust gas) can be controlled by controlling the degree of opening of the EGR valve 29.

The internal combustion engine 1 has a fuel injection valve 33 attached thereto, which is provided for each cylinder 2 as a constituent element of a fuel supply unit, which supplies a fuel to be burnt in the combustion chamber 3 in each cylinder 2. A fuel, such as gasoline, the pressure of which has been increased by a pump or the like, is supplied to the fuel injection valve 33 from a fuel tank (not shown).

The fuel injection valve 33 in the present embodiment is a port injection type and attached to the intake manifold 5, as illustrated in FIG. 2. The amount of a fuel to be injected (the amount of a fuel to be supplied into the combustion chamber 3) can be controlled by controlling the duration of opening of the fuel injection valve 33. The fuel injection valve 33 may alternatively be a direct injection type.

The internal combustion engine 1 further has spark plugs 40 attached thereto, each of which is provided for each cylinder 2 as a constituent element of an ignition device that ignites an air-fuel mixture compressed in the combustion chamber 3 of each cylinder 2.

The spark plug 40 is mounted on the top of the combustion chamber 3 of each cylinder 2, as illustrated in FIG. 2, and implements a spark discharge when a high voltage is supplied thereto from a distributor (not shown) at a predetermined timing.

The above has described the mechanical construction of the system, namely, the internal combustion engine 1 and the system attached thereto, according to the present embodiment.

The electronic control unit 50 is an electronic circuit unit, which includes a CPU, a RAM, a ROM and the like. The electronic control unit 50 executes a program installed therein to control the operations of the throttle valve 7, the valve phase changing mechanism 10 and the valve lift changing mechanism 11 of the intake valve driving mechanism 9, the EGR valve 29 of the EGR unit 25, the fuel injection valves 33, and the spark plugs 40.

The electronic control unit 50 carrying out the aforesaid control receives the detection signals from various sensors. The system according to the present embodiment has sensors described below, and the detection signals of the sensors are input to the electronic control unit 50.

In the system according to the present embodiment, a rotational speed sensor 51, which outputs a signal for detecting the number of rotations NE (rotational speed) of the crankshaft 12 of the internal combustion engine 1 (more specifically, a pulse signal generated for each predetermined rotational angle of the crankshaft 12), is attached to the internal combustion engine 1.

Further, the intake passage 4 is provided with an air flow sensor 52, which detects a flow rate Q of air passing through the intake passage 4, and a pressure sensor 53, which detects a pressure P2 of air flowing into the throttle valve 7.

Further, the system according to the present embodiment has an acceleration sensor 54, which detects the amount of depression on a gas pedal (hereinafter referred to as the accelerator manipulated variable) of a vehicle, which is not shown.

The operation of the system according to the present embodiment will now be described. The electronic control unit 50 carries out the control processing illustrated by the flowchart in FIG. 7 in order to control the operation of the internal combustion engine 1.

Figure 7:
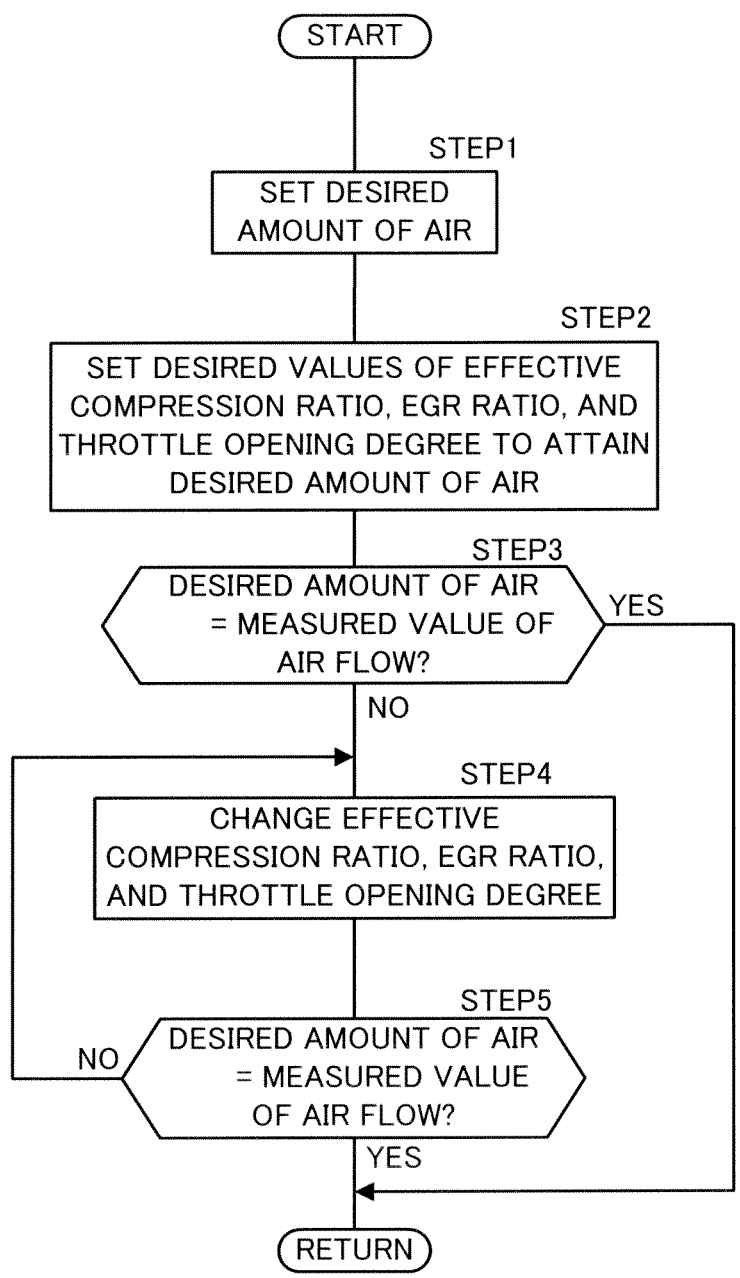
FIG. 7 is a flowchart illustrating the processing by an electronic control unit shown in FIG. 1.

The control processing illustrated by the flowchart in FIG. 7 is for controlling the operational state of the intake valve driving mechanism 9 (more specifically, the type of the intake cam used as the actively driving intake cam, namely, the large lift intake cam 13H or the small lift intake cam 13L, and the phase angle of the actively driving intake cam 13L or 13H), the degree of opening of the EGR valve 29 of the EGR unit 25, and the degree of opening of the throttle valve 7 (hereinafter referred to as the throttle opening degree) in order to control the amount of air to be supplied to the combustion chamber 3 of each cylinder 2 of the internal combustion engine 1. In this case, the control processing of the operational state of the intake valve driving mechanism 9 is the processing for controlling the effective compression ratio of the combustion chamber 3 of each cylinder 2, whereas the control processing of the degree of opening of the EGR valve 29 is the processing for controlling the EGR ratio.

In the control processing illustrated by the flowchart in FIG. 7, the electronic control unit 50 first determines in STEP 1 a desired amount of air, which is the desired value of the air flow rate Q in the intake passage 4.

Figure 8:
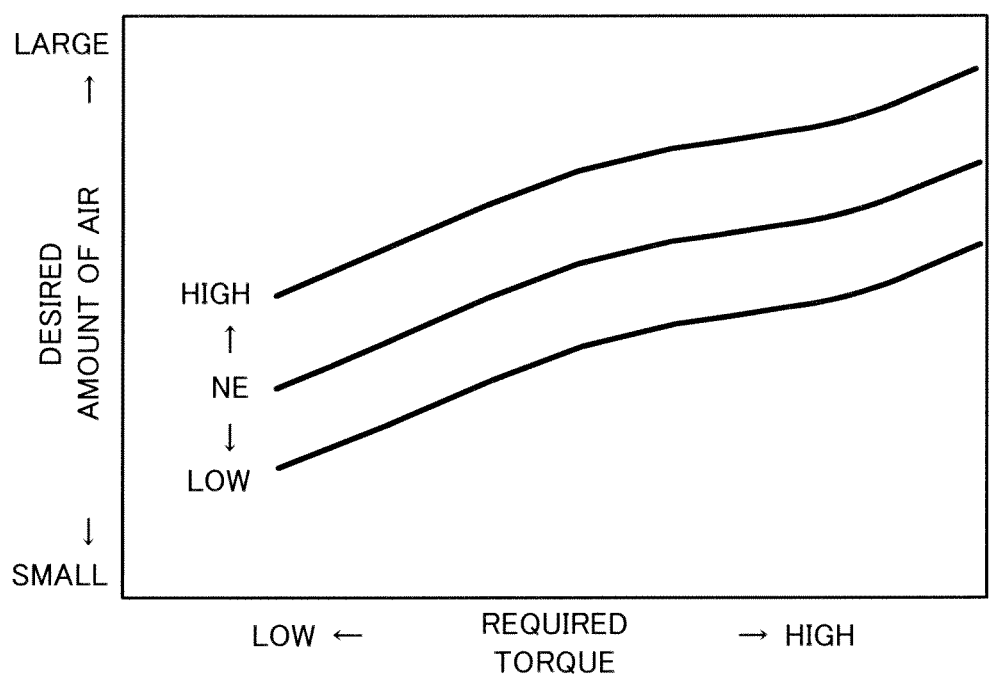
FIG. 8 is a map used for the processing in STEP 1 of FIG. 7.

To be more specific, the electronic control unit 50 determines a desired amount of air necessary for attaining a required torque according to a map, which has been set as illustrated in FIG. 8 (a map specifying the relationship among a required torque, a rotational speed NE, and a desired amount of air), on the basis of the required torque (the desired value of an output torque) of the internal combustion engine 1 and the measured value of the rotational speed NE recognized from an output of the rotational speed sensor 51.

The basic tendency of the map shown in FIG. 8 is set such that the desired amount of air increases as the required torque increases and the desired amount of air increases as the rotational speed NE increases. The required torque is determined according to a map (not shown) on the basis of the measured value of an accelerator manipulated variable recognized from an output of the acceleration sensor 54 or the measured value of the accelerator manipulated variable and the measured value of a vehicle speed. In this case, the required torque is basically determined such that it increases as the accelerator manipulated variable increases.

Then, the electronic control unit 50 proceeds to STEP 2 to set the desired value of the effective compression ratio, the desired value of the EGR ratio, and the desired value of the throttle opening degree for achieving the desired amount of air.

Figure 9:
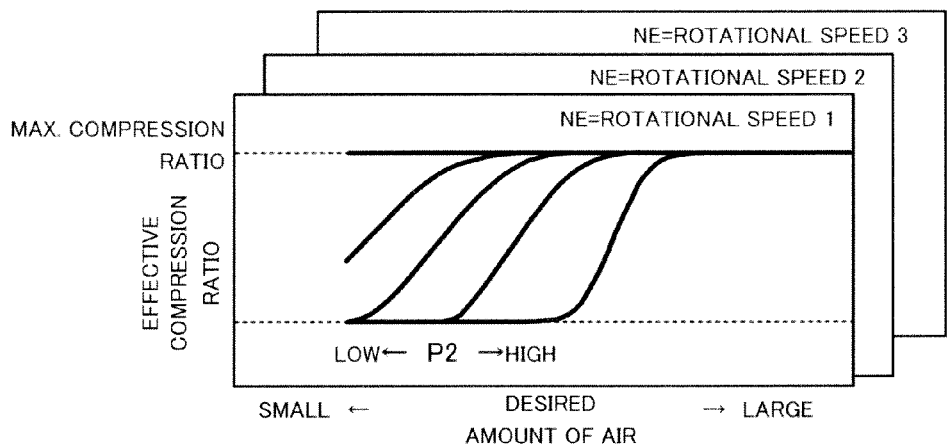
FIGS. 9 to 11 are maps used for the processing in STEP 2 of FIG. 7.

To be more specific, the electronic control unit 50 sets the desired value of the effective compression ratio according to a map set as illustrated in FIG. 9 from the desired amount of air determined in STEP 1, the pressure P2 recognized by an output of the pressure sensor 53 (the pressure of air flowing into the throttle valve 7) and the measured value of the rotational speed NE of the internal combustion engine 1 (a map specifying the relationship among the desired amount of air, the pressure P2, the rotational speed NE, and the desired value of the effective compression ratio). The basic tendency of the map shown in FIG. 9 is set such that the desired value of the effective compression ratio increases as the desired amount of air increases, and the desired value of the effective compression ratio decreases as the pressure P2 increases.

Figure 10:
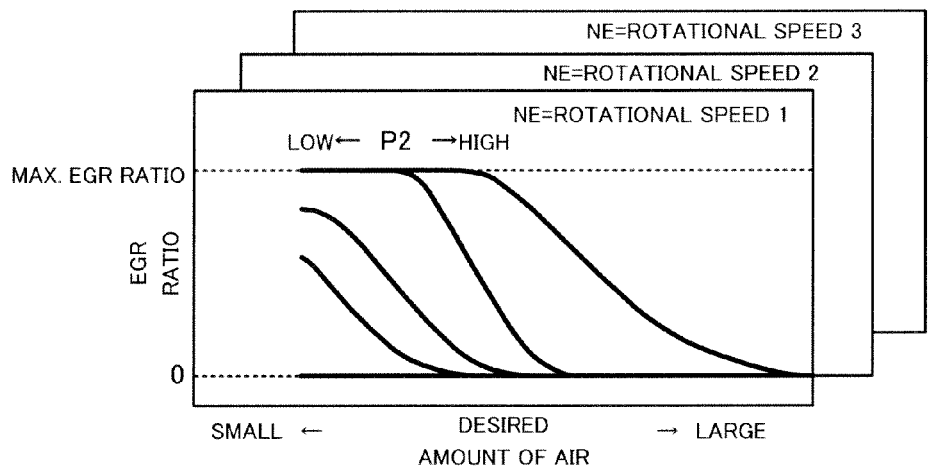

Further, the electronic control unit 50 sets the desired value of the EGR ratio according to a map set as illustrated in FIG. 10 from the desired amount of air, the measured value of the pressure P2, and the measured value of the rotational speed NE (a map specifying the relationship among the desired amount of air, the pressure P2, the rotational speed NE, and the desired value of the EGR ratio). The basic tendency of the map shown in FIG. 10 is set such that the desired value of the EGR ratio decreases as the desired amount of air increases, and the desired value of the EGR ratio increases as the pressure P2 increases.

Figure 11:
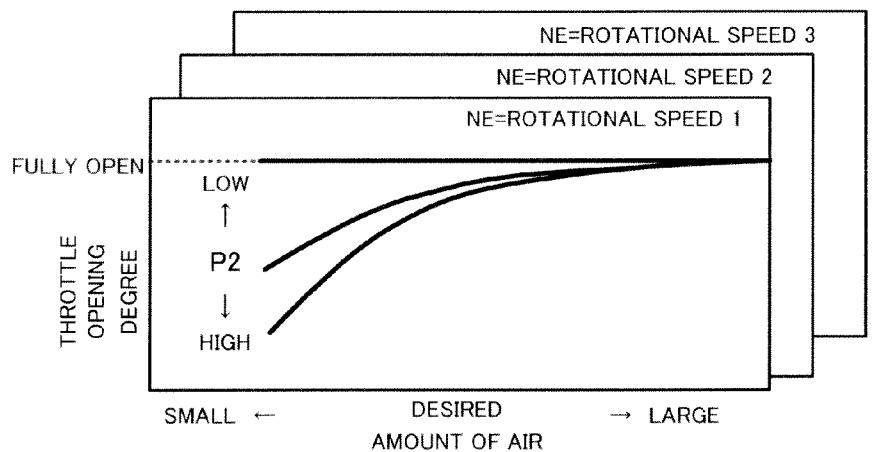

Further, the electronic control unit 50 sets the desired value of the throttle opening degree according to a map set as illustrated in FIG. 11 from the desired amount of air, the measured value of the pressure P2, and the measured value of the rotational speed NE (a map specifying the relationship among the desired amount of air, the pressure P2, the rotational speed NE, and the desired value of the throttle opening degree). The basic tendency of the map shown in FIG. 11 is set such that the desired value of the throttle opening degree increases as the desired amount of air increases, the desired value of the throttle opening degree decreases as the pressure P2 increases, and the desired value of the throttle opening degree increases as the rotational speed NE increases.

The desired amount of air is set to increase as the required torque of the internal combustion engine 1 increases, so that the desired value of the effective compression ratio determined using the map in FIG. 9 will be consequently determined on the basis of a characteristic in which the desired value of the effective compression ratio increases as the required torque increases, i.e., as the load on the internal combustion engine 1 increases.

The desired value of the EGR ratio determined using the map in FIG. 10 will be consequently determined on the basis of a characteristic in which the desired value of the EGR ratio decreases as the required torque increases, i.e., as the load on the internal combustion engine 1 increases.

The desired value of the throttle opening degree determined using the map in FIG. 11 will be consequently determined on the basis of a characteristic in which the desired value of the throttle opening degree increases as the required torque increases.

Subsequently, the electronic control unit 50 proceeds to STEP3 to determine whether the measured value of the air flow rate Q recognized from an output of the air flow sensor 52 coincides with the desired amount of air determined in STEP1. In this case, the measured value of the air flow rate Q coinciding with the desired amount of air means that the absolute value of the difference therebetween is a predetermined value or less rather than meaning that they are precisely equal.

If the determination result in STEP3 is affirmative, then the electronic control unit 50 terminates the current processing of the flowchart in FIG. 7 and stands by until the next arithmetic processing cycle. In this case, the operational state of the intake valve driving mechanism 9, the opening degree of the EGR valve 29, and the throttle opening degree are maintained at the current state and values, respectively.

Meanwhile, if the determination result in STEP3 is negative, the electronic control unit 50 carries out the processing in STEP4. In STEP4, the electronic control unit 50 changes the current values of the actual effective compression ratio, the actual EGR ratio, and the actual throttle opening degree so as to bring the actual air flow rate Q (the measured value) close to the desired amount of air.

Further, the electronic control unit 50 carries out, in STEP5 following STEP4, the same determination processing as that in STEP3 and repeats the processing in STEP4 until the determination result in STEP5 switches to be affirmative.

In this case, the processing in STEP4 repeated as described above will be specifically carried out as follows. The processing in the first STEP4 following STEP3 controls the actual operational state of the intake valve driving mechanism 9, the actual opening degree of the EGR valve 29, and the actual throttle opening degree, and the actual throttle opening degree to the standard operational state determined on the basis of the desired value of the effective compression ratio set in STEP2, the standard opening degree of the EGR valve 29 determined on the basis of the desired value of the EGR ratio set in STEP2, and the desired value of the throttle opening degree set in STEP2, respectively.

In this case, the standard operational state of the intake valve driving mechanism 9 is an operational state for achieving the desired value of the effective compression ratio set in STEP2. Based on the desired value, the standard operational state of the intake valve driving mechanism 9 is determined according to a map or the like set beforehand. The standard opening degree of the EGR valve 29 is the opening degree for achieving the desired value of the EGR ratio set in STEP2. Based on the desired value, the standard opening degree of the EGR valve 29 is determined according to a map or the like set beforehand.

If the determination processing in STEP5 indicates that the air flow rate Q is smaller than the desired amount of air, then the processing in STEP4 changes the actual operational state of the intake valve driving mechanism 9 from the current operational state so as to increase the effective compression ratio by a predetermined amount, reduces the actual opening degree of the EGR valve 29 from the current opening degree by a predetermined amount from (thereby to reduce the EGR ratio), and increases the actual throttle opening degree by a predetermined amount from the current opening degree.

If the determination processing in STEP5 indicates that the air flow rate Q is larger than the desired amount of air, then the processing in STEP4 changes the actual operational state of the intake valve driving mechanism 9 from the current operational state so as to decrease the effective compression ratio by a predetermined amount, increases the actual opening degree of the EGR valve 29 by a predetermined amount from the current opening degree (thereby to increase the EGR ratio), and reduces the actual throttle opening degree by a predetermined amount from the current opening degree.

As described above, the processing in STEP4 is repeatedly carried out to adjust the actual operational state of the intake valve driving mechanism 9, the actual opening degree of the EGR valve 29, and the actual throttle opening degree to the vicinities of the standard operational state corresponding to the desired value of the effective compression ratio, the standard opening degree corresponding to the desired value of the EGR ratio, and the desired value of the throttle opening degree, respectively. Thus, the actual operational state of the intake valve driving mechanism 9, the actual opening degree of the EGR valve 29, and the actual throttle opening degree are controlled such that the actual air flow rate Q (the measured value) agrees with the desired amount of air.

The above has described in detail the processing illustrated by the flowchart in FIG. 7.

A more detailed description will be given of the control of the operational state of the intake valve driving mechanism 9 in the aforesaid STEP4.

Figure 12:
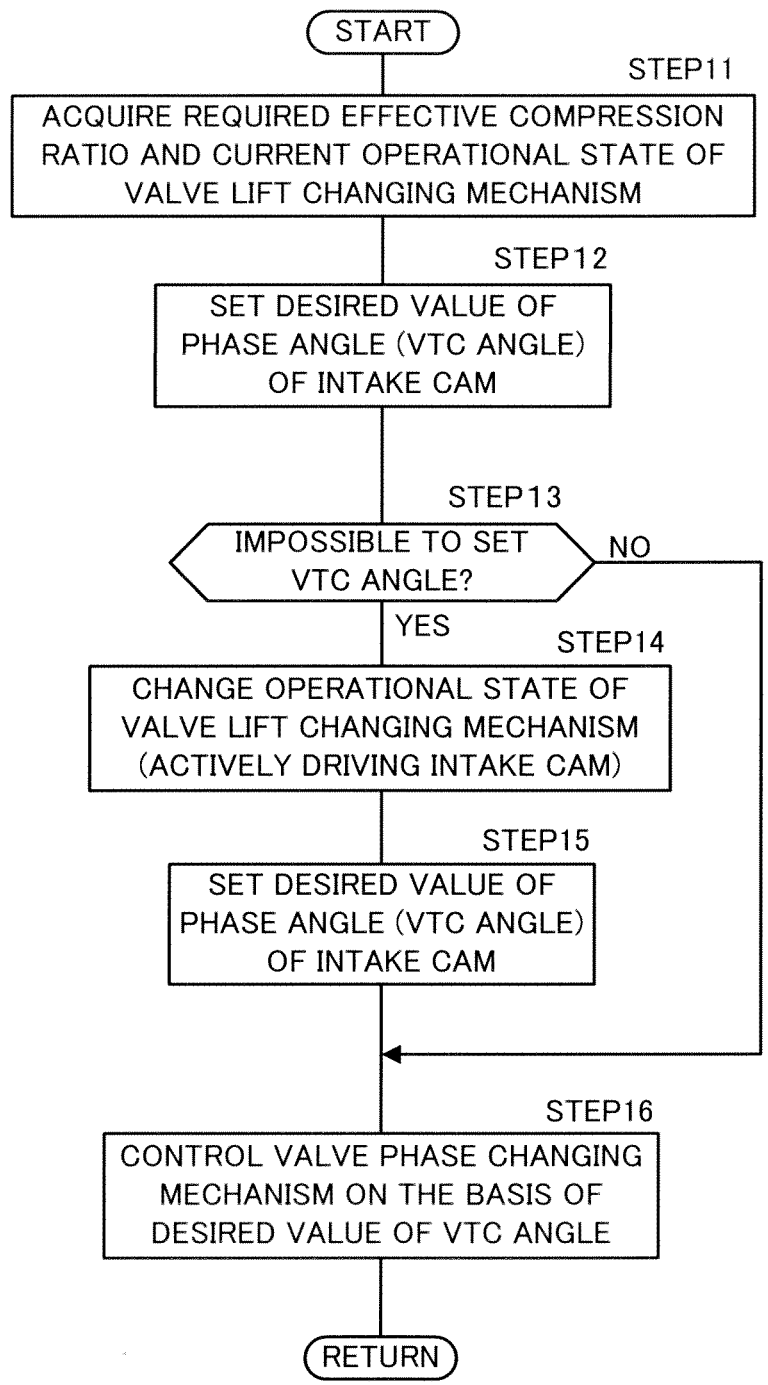
FIG. 12 is a flowchart illustrating the control processing related to an effective compression ratio in the processing in STEP 4 shown in FIG. 7.

The control of the operational state of the intake valve driving mechanism 9 in the aforesaid STEP4 is, more specifically, accomplished by the control processing illustrated by the flowchart in FIG. 12.

In other words, the electronic control unit 50 acquires in STEP11 a required effective compression ratio and the current operational state of the valve lift changing mechanism 11.

In this case, the processing in the first STEP4 following the STEP3 acquires, as the required effective compression ratio, the desired value of the effective compression ratio determined in the aforesaid STEP2. In the processing carried out in STEP4 in the case where the determination result in STEP5 is negative, the desired value is the value that has been corrected, by a predetermined amount, the required effective compression ratio acquired by the processing in STEP4 immediately before the determination processing in STEP5 (the processing in the previous STEP4), the required effective compression ratio being hereinafter referred to as the previous required effective compression ratio.

More specifically, the required effective compression ratio acquired by the processing in STEP11 in the case where the determination processing in STEP5 indicates that the air flow rate Q is smaller than the desired amount of air is the compression ratio of the value obtained by increasing the previous required effective compression ratio by a predetermined amount. Further, the required effective compression ratio acquired by the processing in STEP11 in the case where the determination processing in STEP5 indicates that the air flow rate Q is larger than the desired amount of air is the compression ratio of the value obtained by decreasing the previous required effective compression ratio by a predetermined amount.

The current operational state of the valve lift changing mechanism 11 that is acquired in STEP11 is, more specifically, the operational state that indicates whether the current actively driving intake cam is the small lift intake cam 13L or the large lift intake cam 13H.

Subsequently, the electronic control unit 50 proceeds to STEP12 to set the desired value of a VTC angle as the phase angle of the actively driving intake cam 13L or 13H.

Figure 13:
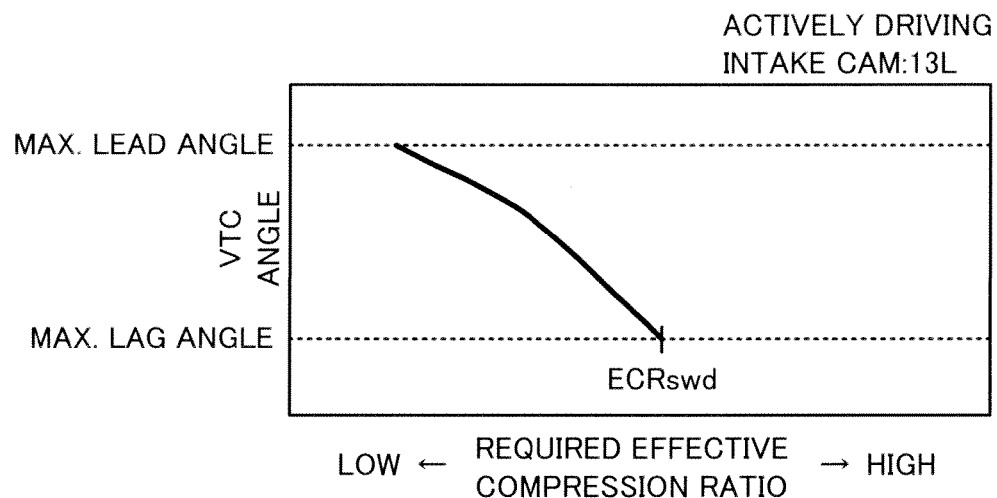
FIGS. 13 and 14 are maps used for the processing in STEP 12 and STEP 15 of FIG. 12.
Figure 14:
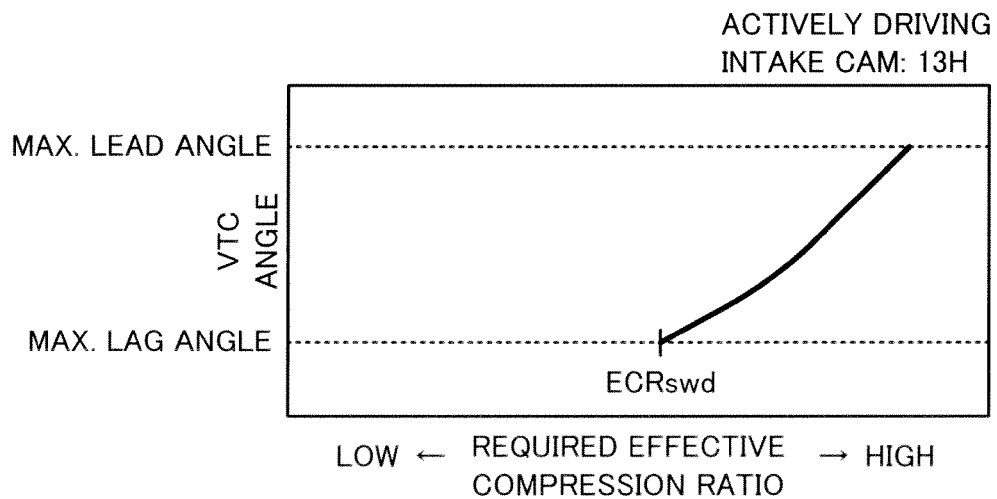

To be more specific, the electronic control unit 50 sets the desired value of the VTC angle on the basis of the required effective compression ratio acquired in STEP 11 according to a preset map illustrated in FIG. 13 or FIG. 14 (a map defining the relationship between the required effective compression ratio and the desired value of the VTC angle).

The different maps are used in STEP12, depending on whether the current actively driving intake cam is the small lift intake cam 13L or the large lift intake cam 13H. If the current actively driving intake cam is the small lift intake cam 13L, then the desired value of the VTC angle is set according to the map shown in FIG. 13, and if the current actively driving intake cam is the large lift intake cam 13H, then the desired value of the VTC angle is set according to the map shown in FIG. 14.

In this case, the tendency of the map shown in FIG. 13 is set such that the VTC angle of the small lift intake cam 13L changes in the lag-angle direction from the maximum lead angle, which is the phase angle on the maximum lead angle side (the phase angle of the small lift intake cam 13L in the state indicated by the solid line a in FIG. 3) to the maximum lag angle, which is the phase angle on the maximum lag angle side (the phase angle of the small lift intake cam 13L in the state indicated by the dashed line b in FIG. 3) as the required effective compression ratio increases (as the load on the internal combustion engine 1 increases) in a region wherein the required effective compression ratio is relatively low (a low-load region of the internal combustion engine 1).

Further, the tendency of the map shown in FIG. 14 is such that the VTC angle of the large lift intake cam 13H changes in the lead-angle direction from the maximum lag angle, which is the phase angle on the maximum lag angle side (the phase angle of the large lift intake cam 13H in the state indicated by the dashed line c in FIG. 3) to the maximum lead angle, which is the phase angle on the maximum lead angle side (the phase angle of the large lift intake cam 13H in the state indicated by the dashed line d in FIG. 3) as the required effective compression ratio increases (as the load on the internal combustion engine 1 increases) in a region wherein the required effective compression ratio is relatively high.

In STEP12, if the current actively driving intake cam is the small lift intake cam 13L and if the required effective compression ratio acquired in STEP11 is larger than an effective compression ratio Ba corresponding to the maximum lag angle in the map of FIG. 13, then the desired value of the VTC angle cannot be set according to the map of FIG. 13.

Similarly, in STEP12, if the current actively driving intake cam is the large lift intake cam 13H and if the required effective compression ratio acquired in STEP11 is smaller than an effective compression ratio Bb corresponding to the maximum lag angle in the map of FIG. 14, then the desired value of the VTC angle cannot be set according to the map of FIG. 14.

Hence, the electronic control unit 50 determines in STEP13 whether setting the desired angle of the VTC angle is impossible. The determination result will be affirmative in the case where the current actively driving intake cam is the small lift intake cam 13L and if the required effective compression ratio is larger than Ba and also in the case where the current actively driving intake cam is the large lift intake cam 13H and if the required effective compression ratio is smaller than Bb. In other cases than these, the determination result in STEP13 will be negative.

If the determination result in STEP 13 is negative (in the case where the desired value of the VTC angle can be properly set in STEP 12), then the electronic control unit 50 proceeds to STEP16. In this STEP16, the electronic control unit 50 controls the valve phase changing mechanism 10 such that the actual VTC angle agrees with the set desired value of the VTC angle.

Meanwhile, if the determination result in STEP13 is affirmative, then the electronic control unit 50 proceeds to STEP14. In this STEP14, the electronic control unit 50 controls the valve lift changing mechanism 11 to switch the actively driving intake cam. More specifically, if the current actively driving intake cam is the small lift intake cam 13L, then the electronic control unit 50 controls the valve lift changing mechanism 11 to switch the actively driving intake cam from the small lift intake cam 13L to the large lift intake cam 13H. If the current actively driving intake cam is the large lift intake cam 13H, then the electronic control unit 50 controls the valve lift changing mechanism 11 to switch the actively driving intake cam from the large lift intake cam 13H to the small lift intake cam 13L.

In the present embodiment, the effective compression ratio Ba corresponding to the maximum lag angle in the map of FIG. 13 and the effective compression ratio Bb corresponding to the maximum lag angle in the map of FIG. 14 are set such that Ba is larger than Bb. Hence, the actively driving intake cam is switched in response to a change in the required effective compression ratio on the basis of a hysteresis characteristic, so that the actively driving intake cam will not be frequently switched even if the required effective compression ratio frequently increases/decreases in the vicinities of Ba and Bb.

Next, the electronic control unit 50 proceeds to STEP15 to carry out the same processing as that in the aforesaid STEP 12 so as to update the desired value of the VTC angle. In this case, the map used for setting the desired value of the VTC angle (the map shown in FIG. 13 or FIG. 14) is selected according to whether the actively driving intake cam after the changeover in STEP14 is the small lift intake cam 13L or the large lift intake cam 13H.

Subsequently, the electronic control unit 50 carries out the processing in STEP16 as described above to control the valve phase changing mechanism 10 so as to cause the actual VTC angle to agree with the set desired value of the VTC angle.

This completes the detailed description of the processing for controlling the effective compression ratio in STEP4 with reference to the flowchart in FIG. 12.

Supplementarily, the standard operational state of the intake valve driving mechanism 9 described in relation to the processing in STEP4 means the operational state of the intake valve driving mechanism 9 implemented by the control processing illustrated by the flowchart in FIG. 12 when the required effective compression ratio acquired in STEP11 agrees with the desired value set in the aforesaid STEP2.

The electronic control unit 50 also carries out the processing for controlling the fuel injection amount of each of the fuel injection valves 33 and the ignition timing of each of the spark plugs 40 in addition to the aforesaid control processing when running the internal combustion engine 1. In this case, the electronic control unit 50 carries out the processing for controlling the fuel injection amount of a fuel injection valve 33 to set the desired value of the fuel injection amount on the basis of the measured value of the air flow rate Q recognized from a detection signal of the air flow sensor 52, the measured value of the pressure P2 (the pressure of air flowing into the throttle valve 7), and the measured value of the rotational speed NE of the internal combustion engine 1 according to a map prepared in advance (not shown). The electronic control unit 50 controls the open valve time of the fuel injection valve 33 of each cylinder 2 on the basis of the set desired value of the fuel injection amount thereby to control the actual fuel injection amount of each fuel injection valve 33 to the desired value.

Further, the electronic control unit 50 carries out the processing for controlling the ignition timing of each of the spark plugs 40 to set the desired value of the ignition timing on the basis of the measured value of the air flow rate Air flow rate Q, the measured value of the pressure P2, and the measured value of the rotational speed NE of the internal combustion engine 1 according to a map prepared in advance (not shown). Then, the electronic control unit 50 controls the actual ignition timing of the spark plug 40 of each cylinder 2 to the desired value.

In the present embodiment, the control processing is carried out by the electronic control unit 50 as described above to control the operation of the internal combustion engine 1.

Supplementarily, in the present embodiment, the large lift intake cam 13H and the small lift intake cam 13L correspond to the first intake cam and the second intake cam, respectively, in the aforesaid first aspect of the invention.

The electronic control unit 50 includes the functions as the intake cam switching control unit and the cam phase control unit in the present invention. In this case, the function as the intake cam switching control unit is implemented by the processing in STEP 14 of the processing illustrated by the flowchart of FIG. 12.

Further, the function as the cam phase control unit is implemented by the processing in STEP16 of the processing illustrated by the flowchart of FIG. 12.

The phase angle A1 shown in FIG. 3 corresponds to the first lead-angle-side valve opening start phase angle and the second lead-angle-side open valve phase angle in the present invention, whereas the phase angle A2 shown in FIG. 3 corresponds to the first lag-angle-side valve opening start phase angle and the second lag-angle-side open valve phase angle in the present invention.

The state in which the phase angles of the intake cams 13H and 13L are controlled to the states indicated by the dashed lines b and c in FIG. 3 corresponds to the specific state in the present invention.

According to the present embodiment described above, the operational state of the intake valve 8 (the phase angle in the open valve period and the lift amount) changes as described below according to the load on the internal combustion engine 1, i.e., the required torque.

For example, in the case where the load on the internal combustion engine 1 increases from the low-load side to the high-load side, the small lift intake cam 13L is used as the actively driving intake cam in the state wherein the load on the internal combustion engine 1 is relatively low, i.e., the required torque is small. Then, the phase angle (the VTC angle) of the small lift intake cam 13L continuously changes from the lead-angle side to the lag-angle side as the load on the internal combustion engine 1 increases.

Hence, the operational state of the intake valve 8 continuously changes toward the state indicated by the dashed line b in FIG. 3 from the state indicated by the solid line a (refer to an arrow Y1 in FIG. 3). Thus, the effective compression ratio of the combustion chamber 3 of each cylinder 2 increases.

Then, when the phase angle (the VTC angle) of the small lift intake cam 13L lags to the maximum lag angle, causing the operational state of the intake valve 8 to reach the state indicated by the dashed line b in FIG. 3, the actively driving intake cam is changed from the small lift intake cam 13L over to the large lift intake cam 13H. By this time, the phase angle (VTC angle) of the large lift intake cam 13H has reached the maximum lag angle, so that the operational state of the intake valve 8 is switched from the state indicated by the dashed line b in FIG. 3 to the state indicated by the dashed line c. This causes the lift amount of the intake valve 8 to increase and the angle width of the open valve period of the intake valve 8 to also increase (refer to an arrow Y2 in FIG. 3).

In this case, in the state wherein the VTC angle has reached the maximum lag angle, the charged air amount or the effective compression ratio of the combustion chamber 3 of each cylinder 2 is the same or substantially the same regardless of whether the small lift intake cam 13L is used as the actively driving intake cam or the large lift intake cam 13H is used as the actively driving intake cam, as previously described.

Therefore, the charged air amount of the combustion chamber 3 of each cylinder 2 is maintained substantially constant before and after the actively driving intake cam is switched. Further, no sudden changes in the phase angles of the intake cams 13L and 13H occur before and after the changeover. As a result, switching the actively driving intake cam will not cause a discontinuous change (stepped change) in an output torque of the internal combustion engine 1. Moreover, the switching can be promptly completed.

Figure 15:
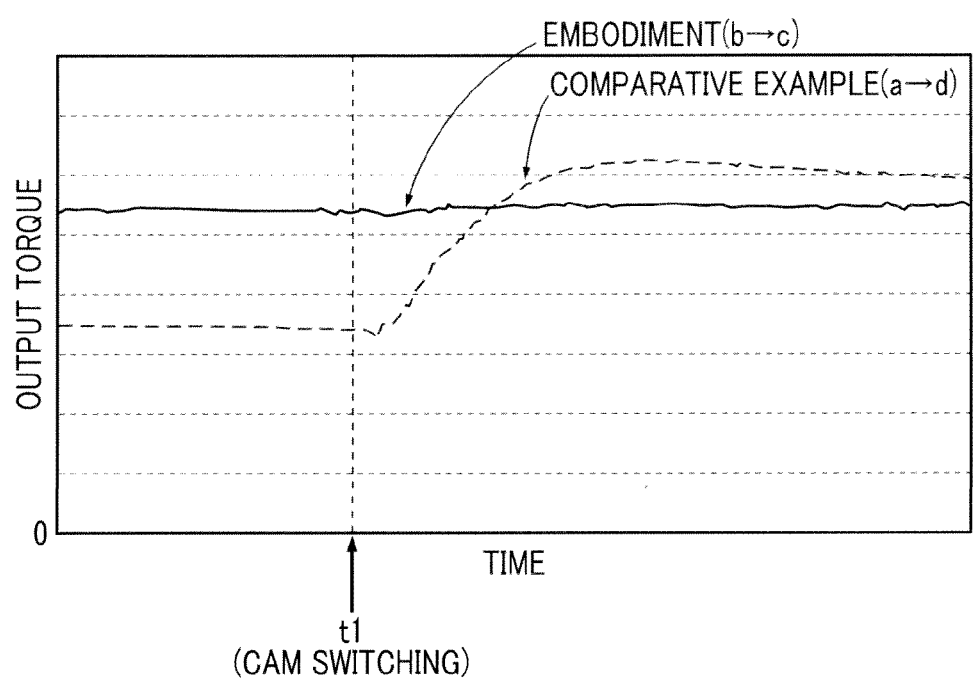
FIG. 15 is a graph illustrating an operation in the first embodiment.

As a matter of fact, it has been verified by experiments performed by the inventors of the present application that the output torque of the internal combustion engine 1 is maintained constant, as illustrated by the solid line in FIG. 15 (the line of the example), in the case where the actively driving intake cam is switched from the small lift intake cam 13L to the large lift intake cam 13H (the operational state of the intake valve 8 is changed from the state indicated by the dashed line b in FIG. 3 over to the state indicated by the dashed line c) while operating the internal combustion engine 1 with the throttle opening degree held constant and the VTC angle controlled to the maximum lead angle.

The dashed line (the line of a comparative example) in FIG. 15 is obtained when the actively driving intake cam is switched from the small lift intake cam 13L to the large lift intake cam 13H (i.e., when the operational state of the intake valve 8 is changed from the state indicated by the solid line a to the solid line d in FIG. 3), with the VTC angle being controlled to, for example, the maximum lead angle. In this case, it has been verified that the changeover of the actively driving intake cam causes a stepped change in the output torque of the internal combustion engine 1.

The phase angle at the start of opening of the intake valve 8 immediately before the changeover of the actively driving intake cam and the phase angle at the start of opening of the intake valve 8 immediately after the changeover are both phase angles between the top dead center and the bottom dead center. Hence, there will be no sudden change in the amount of exhaust gas (the exhaust gas recirculated by the EGR unit 25) charged together with air into the combustion chamber 3 of each cylinder 2 in the open valve period of the intake valve 8 before and after the changeover.

Further, according to the present embodiment, when the load on the internal combustion engine 1 increases and the actively driving intake cam is switched to the large lift intake cam 13H, the phase angle (the VTC angle) of the large lift intake cam 13H continuously changes from the lag angle side to the lead angle side as the load on the internal combustion engine 1 (the required torque) increases. For this reason, the operational state of the intake valve 8 continuously changes from the state indicated by the dashed line c in FIG. 3 to the state indicated by the solid line d (refer to an arrow Y3 in FIG. 3). This causes the effective compression ratio of the combustion chamber 3 of each cylinder 2 to further increase.

According to the present embodiment, therefore, the charged air amount or the effective compression ratio of the combustion chamber 3 of each cylinder 2 smoothly increases without a stepped change when the load on the internal combustion engine 1 increases from the low-load side to the high-load side. In addition, a sudden stepped change in the amount of the exhaust gas to be charged into the combustion chamber 3 of each cylinder 2 before and after switching the actively driving intake cam will be also prevented.

As a result, the output torque of the internal combustion engine 1 can be smoothly increased without the occurrence of a misfire of the internal combustion engine 1.

In the case where the load on the internal combustion engine 1 reduces from the high-load side to the low-load side, the change in the operational state of the intake valve 8 is reversed from that in the case where the load on the internal combustion engine 1 increases. More specifically, the intake valve 8 is opened/closed by the large lift intake cam 13H when the internal combustion engine 1 is run in the high-load operation mode. Then, the phase angle of the open valve period of the intake valve 8 changes in the lag-angle direction from the state indicated by the solid line d in FIG. 3 to the state indicated by the dashed line c as the load on the internal combustion engine 1 reduces.

Subsequently, in the state wherein the phase angles of the intake cams 13L and 13H have been controlled to the maximum lag angles corresponding to the states indicated by the dashed lines b and c, respectively, the actively driving intake cam is switched from the large lift intake cam 13H to the small lift intake cam 13L.

When the internal combustion engine 1 is run in the low-load operation mode thereafter, the intake valve 8 is opened/closed by the small lift intake cam 13L. Further, the phase angle in the open valve period of the intake valve 8 changes in the lead-angle direction from the state indicated by the dashed line b in FIG. 3 to the state indicated by the solid line a as the load on the internal combustion engine 1 decreases.

Thus, as with the case where the load increases, the charged air amount or the effective compression ratio of the combustion chamber 3 of each cylinder 2 smoothly decreases without changing in steps even in the case where the load on the internal combustion engine 1 decreases from the high-load side to the low-load side. In addition, a sudden stepped change in the amount of exhaust gas to be charged into the combustion chamber 3 of each cylinder 2 before and after switching the actively driving intake cam will be prevented. As a result, the output torque of the internal combustion engine 1 can be smoothly decreased without the occurrence of a misfire of the internal combustion engine 1.

Further, the effective compression ratio of the combustion chamber 3 of each cylinder 2 increases or decreases as the load on the internal combustion engine 1 increases or decreases, thus making it possible to restrain a change in the opening degree of the throttle valve 7 relative to a change in the load on the internal combustion engine 1. Consequently, the degree of opening of the throttle valve 7 can be maintained to be slightly larger over an extensive range of load on the internal combustion engine 1. This permits higher thermal efficiency of the internal combustion engine 1 and restrained fuel consumption.

In the present embodiment, the phase angle at the start of opening of the intake valve 8 by the large lift intake cam 13H (the phase angle closest to the maximum lag angle end) and the phase angle at the start of opening of the intake valve 8 by the small lift intake cam 13L (the phase angle closest to the maximum lag angle end) when the actively driving intake cam is switched have been set to be the same, namely, A2 in FIG. 3; however, these phase angles may alternatively be set to be slightly different.

Further alternatively, the phase angle closest to the maximum lead angle end of the phase angle at the start of opening of the intake valve 8 by the large lift intake cam 13H and the phase angle closest to the maximum lead angle end of the phase angle at the start of opening of the intake valve 8 by the small lift intake cam 13L may be set to be different from each other.

Second Embodiment

A second embodiment of the present invention will now be described with reference to FIG. 16 through FIG. 18. The present embodiment is the same as the first embodiment, including the system construction of an internal combustion engine 1, except for the aspects related to the control of the phase angles of intake cams 13L and 13H at the time of switching an actively driving intake cam from one of the intake cams 13L and 13H to the other.

Hence, in the present embodiment, the description will be focused on the aspect that is different from the first embodiment and the same aspects as those of the first embodiment will not be described.

According to the present embodiment, the phase angles of the intake cams 13L and 13H (the phase angles corresponding to the states indicated by the dashed lines b and c in FIG. 3) at the time of switching the actively driving intake cam from one of the intake cams 13L and 13H to the other are set to enable the internal combustion engine 1 to be operated at highest possible thermal efficiency.

The setting principle will be described below with reference to FIG. 16. In FIG. 16, a curve f1 in FIG. 17 indicates an example of actually measured data of the characteristic of changes in the relative thermal efficiency of the internal combustion engine 1 in relation to the effective compression ratio achieved by changing the phase angle of the large lift intake cam 13H in the case where the large lift intake cam 13H is used as the actively driving intake cam, whereas a curve f2 indicates an example of actually measured data of the characteristic of changes in the relative thermal efficiency of the internal combustion engine 1 in relation to the effective compression ratio achieved by changing the phase angle of the small lift intake cam 13L in the case where the small lift intake cam 13L is used as the actively driving intake cam.

In this case, the curve f1 illustrates, to be more specific, a case where the phase angle at the end of opening of the intake valve 8 is changed from the phase angle at the bottom dead center within a lag-angle-side range (hereinafter referred to as the case of lagged closing of the intake valve 8 in some cases) by changing the phase angle of the large lift intake cam 13H, the operating conditions (e.g., an atmospheric pressure, an atmospheric temperature and the specifications of a fuel) being set to predetermined conditions.

A curve f2 illustrates a case where the phase angle at the end of opening of the intake valve 8 is changed from the phase angle at the bottom dead center within a lead-angle-side range (hereinafter referred to as the case of early closing of the intake valve 8 in some cases) by changing the phase angle of the small lift intake cam 13L under the aforesaid operating conditions.

Figure 16:
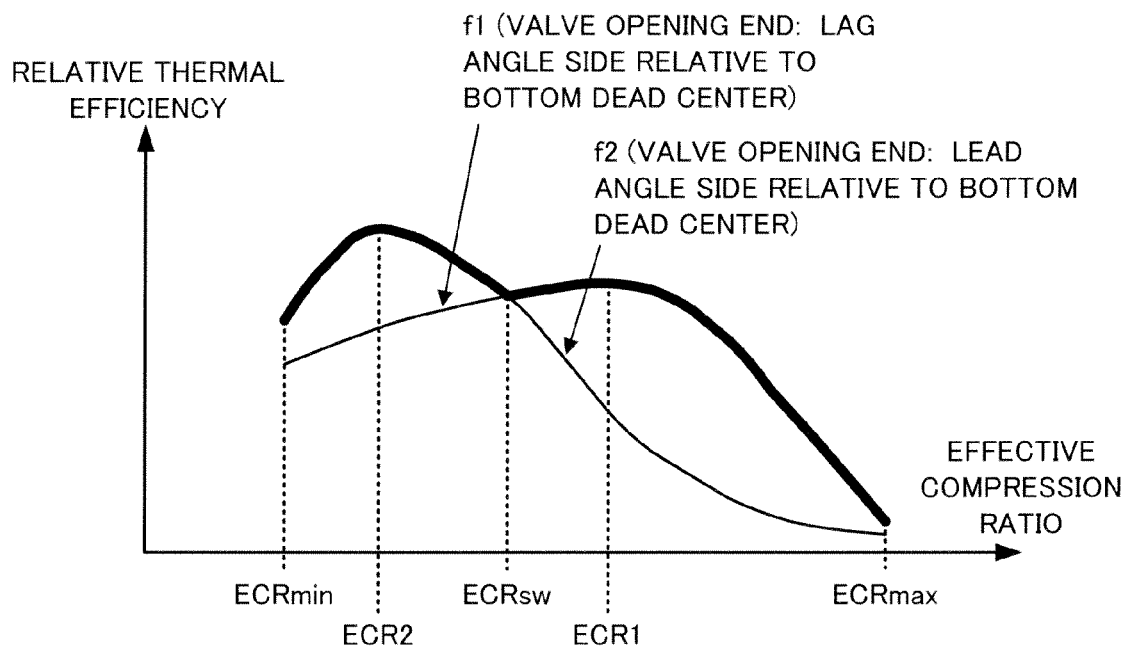
FIG. 16 is a graph illustrating the relationship between an effective compression ratio in the combustion chamber of each cylinder of the internal combustion engine and a relative thermal efficiency of the internal combustion engine with regard to a second embodiment of the present invention.

In FIG. 16, ECRmax denotes an upper-limit effective compression ratio at which the combustion in the combustion chamber 3 of each cylinder 2 of the internal combustion engine 1 can be normally accomplished without knocking, and ECRmin denotes a lower-limit effective compression ratio at which the combustion in the combustion chamber 3 of each cylinder 2 of the internal combustion engine 1 can be normally accomplished without a misfire or the like.

Further, the relative thermal efficiency related to the axis of ordinate of curves f1 and f2 in FIG. 16 is, to be more specific, a ratio obtained by dividing a thermal efficiency $\eta$ of the internal combustion engine 1, which is actually measured in the case where the internal combustion engine is operated at an effective compression ratio of an arbitrary value of the combustion chamber 3 of each cylinder 2 of the internal combustion engine 1 implemented by opening/closing the intake valve 8 by the large lift intake cam 13H or the small lift intake cam 13L, by a thermal efficiency $\eta 0$ (hereinafter referred to as the standard thermal efficiency $\eta 0$ in some cases) of the internal combustion engine 1, which is actually measured in the case where the internal combustion engine 1 is operated at Otto cycle while charging air of the same amount as the amount of air, which is charged into the combustion chamber 3 on the basis of the effective compression ratio, into the combustion chamber 3, i.e., a ratio of $\eta$ to $\eta 0$ $(=\eta/\eta 0)$.

In this case, the operation of the internal combustion engine 1 at the Otto cycle is an operation in which the large lift intake cam 13H is used as the actively driving intake cam to open/close the intake valve 8 according to the pattern indicated by the solid line d in FIG. 3. More specifically, the operation is performed in a state wherein the effective compression ratio of the combustion chamber 3 of each cylinder 2 coincides with a mechanical compression ratio (the ratio of the volume of the entire combustion chamber 3 at the bottom dead center of the piston 15 to the volume of the entire combustion chamber 3 at the top dead center of the piston 15), i.e., a state in which the compression ratio and the expansion ratio substantially agree with each other.

The aforesaid standard thermal efficiency $\eta 0$ corresponding to the value of an arbitrary effective compression ratio on the curve f1 in FIG. 16 (hereinafter denoted by ECRx1) indicates, more specifically, the thermal efficiency of the internal combustion engine 1 actually measured in the case where the internal combustion engine 1 is operated at the Otto cycle after the degree of opening of the throttle valve 7 is adjusted such that the amount of air charged into the combustion chamber 3 of each cylinder 2 of the internal combustion engine 1 to be operated at the Otto cycle becomes the same as the amount of air charged into the combustion chamber 3 in the case where the operation of the internal combustion engine 1 is performed, in which the intake valve 8 is opened/closed by the large lift intake cam 13H with the phase angle of the large lift intake cam 13H controlled so as to set the effective compression ratio of the combustion chamber 3 of the each cylinder 2 to ECRx1 (Atkinson-cycle operation).

Similarly, the aforesaid standard thermal efficiency η0 corresponding to the value of an arbitrary effective compression ratio on the curve f2 in FIG. 16 (hereinafter denoted by ECRx2) indicates the thermal efficiency of the internal combustion engine 1 actually measured in the case where the internal combustion engine 1 is operated at the Otto cycle after the degree of opening of the throttle valve 7 is adjusted such that the amount of air charged into the combustion chamber 3 of each cylinder 2 of the internal combustion engine 1 to be operated at the Otto cycle becomes the same as the amount of air charged into the combustion chamber 3 in the case where the operation of the internal combustion engine 1 is performed, in which the intake valve 8 is opened/closed by the small lift intake cam 13L with the phase angle of the small lift intake cam 13L controlled so as to set the effective compression ratio of the combustion chamber 3 of the each cylinder 2 to ECRx2 (Atkinson-cycle operation).

The upper-limit effective compression ratio ECRmax and the lower-limit effective compression ratio ECRmin in the present embodiment are compression ratios that agree or substantially agree with the effective compression ratio attained in the case where the intake valve 8 is opened at the phase angle of the pattern illustrated by the solid line d in FIG. 3 (the effective compression ratio in the case where the phase angle at the end of opening of the intake valve 8 is set to agree with the phase angle at the bottom dead center), as indicated in FIG. 4. Further, the lower-limit effective compression ratio ECRmin is a compression ratio that agrees or substantially agrees with the effective compression ratio attained when the intake valve 8 is opened according to the pattern illustrated by the solid line a in FIG. 3.

However, the effective compression ratio observed when the phase angle at the end of opening of the intake valve 8 is set to agree with the phase angle at the bottom dead center (≈expansion ratio) may be a compression ratio that is larger than the upper-limit effective compression ratio ECRmax. In this case, the variable range (a mechanical variable range or a variable range implemented by control) of the phase angle of the large lift intake cam 13H may be restricted such that the maximum effective compression ratio actually achieved by changing the phase angle of the large lift intake cam 13H becomes a compression ratio of ECRmax or less.

Alternatively, the variable range (a mechanical variable range or a variable range implemented by control) of the phase angle of the small lift intake cam 13L may be restricted such that the minimum effective compression ratio actually achieved by changing the phase angle of the small lift intake cam 13L becomes a compression ratio that is larger than the lower-limit effective compression ratio ECRmin.

As can be understood from the curve f2 in FIG. 16, in the case of the early closing of the intake valve 8, a change in the relative thermal efficiency of the internal combustion engine 1 in response to a change in the effective compression ratio is characterized in that, basically, the relative thermal efficiency becomes maximum at a relatively small effective compression ratio (ECR2 in the graph) closer to ECRmin out of the upper-limit effective compression ratio ECRmax and the lower-limit effective compression ratio ECRmin.

In contrast thereto, as can be seen from the curve f1 in FIG. 16, in the case of the late closing of the intake valve 8, a change in the relative thermal efficiency of the internal combustion engine 1 in response to a change in the effective compression ratio is characterized in that the relative thermal efficiency becomes maximum at a relatively large effective compression ratio (ECR1 in the graph) closer to ECRmax out of the upper-limit effective compression ratio ECRmax and the lower-limit effective compression ratio ECRmin.

In the case of the value of the effective compression ratio at which the relative thermal efficiency in the early closing of the intake valve 8 and the relative thermal efficiency in the late closing thereof agree with each other, i.e., at an effective compression ratio that is smaller than the effective compression ratio ECRsw at the intersection of the curves f1 and f2, the relative thermal efficiency of the internal combustion engine 1 will be higher in the case of the early closing of the intake valve 8 than in the case of the late closing. At an effective compression ratio that is larger than ECRsw, the relative thermal efficiency of the internal combustion engine 1 will be higher in the case of the late closing of the intake valve 8 than in the case of the early closing.

The ECRsw takes a value between the effective compression ratio ECR1 at which the relative thermal efficiency reaches its maximum level in the case of the early closing and the effective compression ratio ECR2 at which the relative thermal efficiency reaches its maximum level in the case of the late closing.

Accordingly, when the internal combustion engine 1 is operated on the low-load side, the intake valve 8 can be opened/closed in the aforesaid early closing mode by the small lift intake cam 13L by switching the actively driving intake cam in a state wherein the effective compression ratio attained in correspondence with the phase angle of each of the small lift intake cam 13L and the large lift intake cam 13H takes a value between ECR1 and ECR2 and preferably coincides or substantially coincides with the ECRsw. Further, when the internal combustion engine 1 is operated on the high-load side, the intake valve 8 can be opened/closed in the aforesaid late closing mode by the large lift intake cam 13H. Thus, the internal combustion engine 1 can be operated at a highest possible thermal efficiency in a variety of load conditions.

In the present embodiment, therefore, the phase angles of both intake cams 13L and 13H at the time of switching the actively driving intake cam are set such that the effective compression ratios at the time of switching the actively driving intake cam, namely, the effective compression ratio implemented in the case where the intake valve 8 is opened/closed in the mode indicated by the dashed line b in FIG. 3 (the early closing mode) by the small lift intake cam 13L, and the effective compression ratio implemented in the case where the intake valve 8 is opened/closed in the mode indicated by the dashed line c in FIG. 3 (the late closing mode) by the large lift intake cam 13H, agree or substantially agree with the aforesaid ECRsw.

Various experiments and studies carried out by the inventors of the present application have indicated that, if an attention is focused on the relationship between the median value between the upper-limit effective compression ratio ECRmax and the lower-limit effective compression ratio ECRmin (=(ECRmax+ECRmin)/2) and the ECRsw, then the ratio of ECRsw to the median value (=ECRsw/median value) ranges from 0.7 to 1.1, although the value of the effective compression ratio ECRsw at the intersection of the curves f1 and f2 slightly changes due to the properties of a fuel, the influences of environmental conditions and the like while the internal combustion engine 1 is being operated.

Hence, in the present embodiment, the upper-limit effective compression ratio ECRmax and the lower-limit effective compression ratio ECRmin, which allow the combustion in the combustion chamber 3 of each cylinder 2 to be normally accomplished without knocking or misfire (combustion failure), have been experimentally determined. Then, the value of the effective compression ratio for the time of switching the actively driving intake cam has been experimentally determined within the range from 0.7×(ECRmax+ECRmin)/2 to 1.1×(ECRmax+ECRmin)/2. In this way, the value of the effective compression ratio used at the time of switching the actively driving intake cam (hereinafter referred to as the cam-switching effective compression ratio ECRswd in some cases) can be set to agree or substantially agree with the aforesaid ECRsw under a variety of operating conditions of the internal combustion engine 1.

According to the present embodiment, the phase angles of the two intake cams 13L and 13H at the time of switching the actively driving intake cam and also the phase angles at the start of opening of the intake valve 8 corresponding to the dashed lines b and c in FIG. 3 are set on the basis of the cam-switching effective compression ratio ECRswd determined as described above.

The operations of the system in the present embodiment will now be described. An electronic control unit 50 in the present embodiment carries out the processing illustrated by the flowcharts shown in FIG. 7 and FIG. 12, as with the first embodiment. In this case, however, the maps used for determining the desired values of the phase angles (VTC angles) of the intake cams 13L and 13H in the processing in STEP 12 and STEP 15 of FIG. 12 are different from those in the first embodiment. The maps shown in FIGS. 17 and 18 are used in the present embodiment in place of the maps shown in FIGS. 13 and 14.

Figure 17:
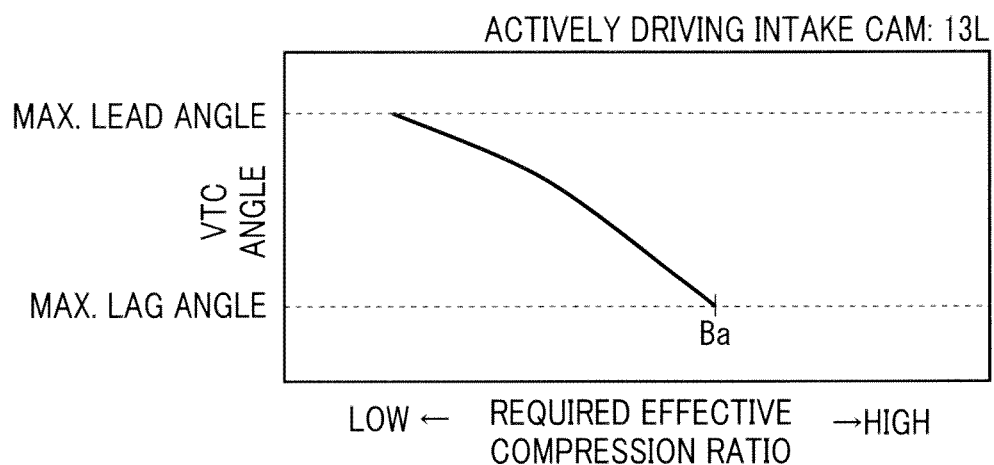
FIGS. 17 and 18 are diagrams showing additional examples of maps used for the processing in STEP12 and STEP15 of FIG. 12 in the second embodiment.

The map shown in FIG. 17 is used when the actively driving intake cam is the small lift intake cam 13L. As with the map shown in FIG. 13, the tendency of the map is set such that the VTC angle of the small lift intake cam 13L changes in the lag-angle direction from the maximum lead angle to the maximum lag angle as the required effective compression ratio increases (as the load on the internal combustion engine 1 increases) in a region wherein the required effective compression ratio is relatively low (a low-load region of the internal combustion engine 1).

Figure 18:
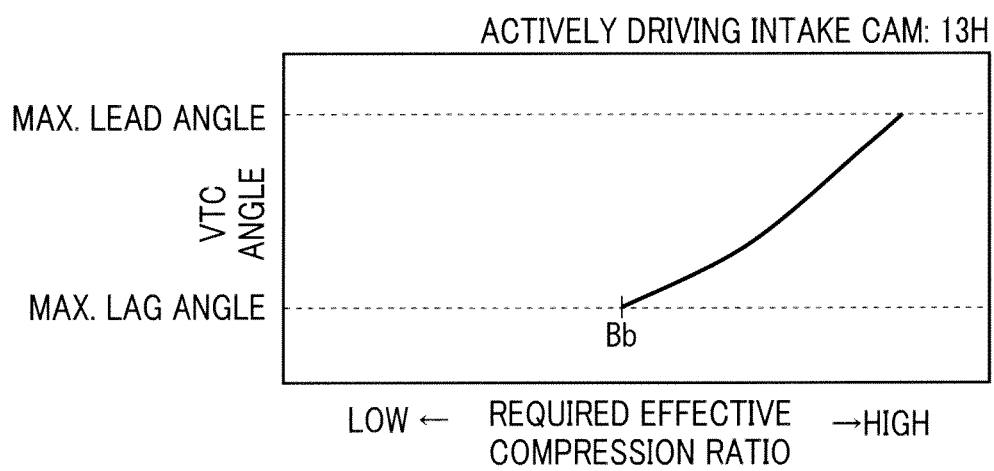

The map shown in FIG. 18 is used when the actively driving intake cam is the large lift intake cam 13H. As with the map shown in FIG. 14, the tendency of the map is set such that the VTC angle of the large lift intake cam 13H changes in the lead-angle direction from the maximum lag angle to the maximum lead angle as the required effective compression ratio increases (as the load on the internal combustion engine 1 increases) in a region wherein the required effective compression ratio is relatively high (a high-load region of the internal combustion engine 1).

The effective compression ratio corresponding to the maximum lag angle in the map of FIG. 17 and the effective compression ratio corresponding to the maximum lead angle in the map of FIG. 18 are set to agree with the aforesaid cam-switching effective compression ratio ECRswd in the present embodiment.

According to the present embodiment, therefore, the determination result of the determination processing in STEP 13 of FIG. 12 is affirmative in the case where the current actively driving intake cam is the small lift intake cam 13L and the required effective compression ratio is larger than ECRswd and in the case where the current actively driving intake cam is the large lift intake cam 13H and the required effective compression ratio is smaller than ECRswd, whereas the determination result is negative in other cases than the above two cases.

In the present embodiment, the effective compression ratio corresponding to the maximum lead angle in the map of FIG. 17 agrees with the lower-limit effective compression ratio ECRmin, while the effective compression ratio corresponding to the maximum lead angle in the map of FIG. 18 agrees with the upper-limit effective compression ratio ECRmax.

Except for the aspects described above, the present embodiment is the same as the first embodiment. Supplementarily, the curves f1 and f2 in FIG. 16 indicate the first relative thermal efficiency characteristic and the second relative thermal efficiency characteristic, respectively, in the present invention. Further, ECR1 and ECR2 in FIG. 16 correspond to the first effective compression ratio and the second effective compression ratio, respectively, in the present invention.

The present embodiment described above is capable of providing the following advantages in addition to the same advantages as those of the first embodiment.

More specifically, according to the present embodiment, the switching of the actively driving intake cam in response to a change in the load on the internal combustion engine 1 is implemented at the phase angle at which the effective compression ratio at the time of the switching becomes the cam-switching effective compression ratio ECRswd. In this case, the cam-switching effective compression ratio ECRswd is set to substantially coincide with the effective compression ratio ECRsw at the intersection of the curves f1 and f2 in FIG. 16.

Hence, in the low-load operation mode of the internal combustion engine 1, in which the opening of the intake valve 8 is controlled such that the effective compression ratio of the combustion chamber 3 of each cylinder 2 of the internal combustion engine 1 becomes smaller than ECRsw, the intake valve 8 can be basically opened/closed by using the small lift intake cam 13L in the early closing mode, which exhibits a relatively higher relative thermal efficiency, as compared with the late closing mode of the intake valve 8.

Further, in the high-load operation mode of the internal combustion engine 1, in which the opening of the intake valve 8 is controlled such that the effective compression ratio of the combustion chamber 3 of each cylinder 2 of the internal combustion engine 1 becomes larger than ECRsw, the intake valve 8 can be basically opened/closed by using the large lift intake cam 13H in the late closing mode that provides a relatively higher relative thermal efficiency, as compared with the early closing mode of the intake valve 8.

Thus, the internal combustion engine 1 can be operated at high thermal efficiency over an extensive operation range from the low load end to the high load end of the internal combustion engine 1. This eventually permits further restrained fuel consumption of the internal combustion engine 1.

Third Embodiment

A third embodiment of the present invention will now be described with reference to FIG. 19 through FIG. 21. The present embodiment differs from the first embodiment only in a part of the construction and control processing related to an intake valve driving mechanism 9. For the present embodiment, therefore, the description will be focused mainly on different aspects, omitting the description of the same components and control processing as those of the first embodiment.

In the intake valve driving mechanism 9 in the present embodiment, the profiles of a small lift intake cam 13L and a large lift intake cam 13H are different from those in the first embodiment, and the rest of the construction is the same as the first embodiment.

Figure 19:
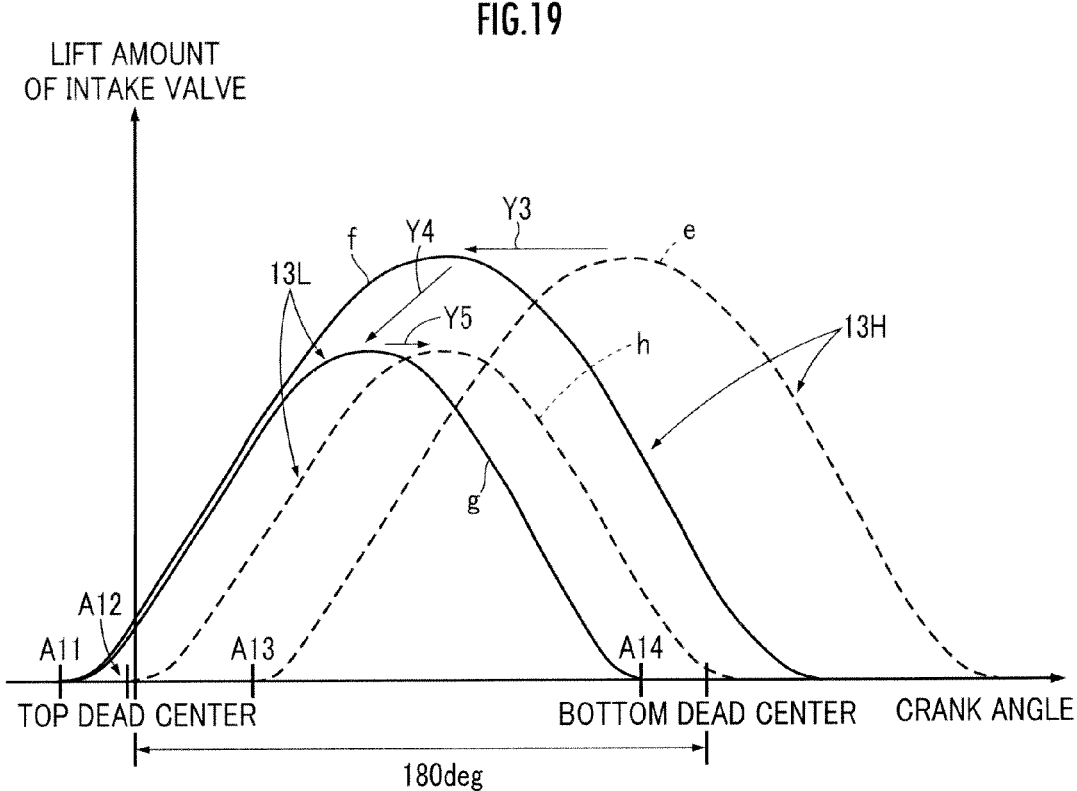
FIG. 19 is a graph illustrating the driving characteristics of an intake valve of an internal combustion engine according to a third embodiment of the present invention.

Referring to FIG. 19, as indicated by a solid line f in FIG. 19, the profile of the large lift intake cam 13H according to the present embodiment is set such that the angle width of the open valve period of an intake valve 8 becomes larger than the angular difference between the phase angle at the top dead center of a piston 15 of each cylinder 2 and the phase angle at the bottom dead center thereof (=180 degrees), e.g., approximately 260 degrees.

Further, as indicated by a solid line g in FIG. 19, the profile of the small lift intake cam 13L is set such that the angle width of the open valve period of the intake valve 8 by the small lift intake cam 13L becomes an angle width that is closer to the angular difference between the phase angle at the top dead center and the phase angle at the bottom dead center, namely, 180 degrees, than the angle width of the open valve period of the intake valve 8 by the large lift intake cam 13H. More specifically, the angle width of the open valve period of the intake valve 8 by the small lift intake cam 13L is set to, for example, an angle width that is slightly larger than the angular difference (180 degrees) between the phase angle at the top dead center and the phase angle at the bottom dead center (e.g., approximately 200 degrees).

The maximum lift amount of the intake valve 8 by the small lift intake cam 13L in the present embodiment is approximately the same as the maximum lift amount of the intake valve 8 by the large lift intake cam 13H in the first embodiment. Accordingly, the maximum lift amount of the intake valve 8 by the large lift intake cam 13H in the present embodiment is still larger than the maximum lift amount of the intake valve 8 by the large lift intake cam 13H in the first embodiment.

As with the first embodiment, the present embodiment also enables the actively driving intake cam, which actually opens/closes the intake valve 8, to be selectively switched to either the small lift intake cam 13L or the large lift intake cam 13H by the valve lift changing mechanism 11 of the intake valve driving mechanism 9. Further, as with the first embodiment, the phase angles of the intake cams 13L and 13H (i.e., the phase angle of the open valve period of the intake valve 8) relative to the phase angle of the crankshaft 12 can be continuously changed within a predetermined range by the valve phase changing mechanism 10.

The profiles of the intake cams 13L and 13H and the opening modes of the intake valve 8 implemented by changes in the phase angles of the intake cams 13L and 13H and the switching between the intake cams 13L and 13H in the present embodiment will be described in more detail.

In the present embodiment, the intake cams 13L and 13H rotate integrally with an intake cam shaft 14, as with the first embodiment. Hence, the mutual phase relationship between the intake cams 13L and 13H, i.e., the mutual phase relationship between the open valve periods of the intake valve 8 by the intake cams 13L and 13H, is maintained constant.

In this case, as with the first embodiment, the mutual phase relationship between the intake cams 13L and 13H is set such that the phase angle at the start of opening of the intake valve 8 by the intake cam 13L and the phase angle at the start of opening of the intake valve 8 by the intake cam 13H are the same with each other (refer to the solid lines f and g in FIG. 19).

Further, according to the present embodiment, the changes in the phase angles of the intake cams 13L and 13H (i.e., the changes in the phase angles of the open valve periods of the intake valve 8 by the intake cams 13L and 13H, respectively) take place within the range between the phase angle corresponding to the state indicated by the solid line f in FIG. 19 and the phase angle corresponding to the state indicated by the dashed line e in FIG. 19 in the case where the intake valve 8 is opened/closed by the large lift intake cam 13H.

Further, the phase angles of the intake cams 13L and 13H are changed within the range between the phase angle corresponding to the state indicated by the solid line g in FIG. 19 and the phase angle corresponding to the state indicated by the dashed line h in FIG. 19 in the case where the intake valve 8 is opened/closed by the small lift intake cam 13L.

The phase angle at the start of opening of the intake valve 8 in the state indicated by the solid line f in FIG. 19 (the phase angle at the start of opening of the intake valve 8 by the large lift intake cam 13H) and the phase angle at the start of the opening of the intake valve 8 in the state indicated by the solid line g in FIG. 19 (the phase angle at the start of opening of the intake valve 8 by the small lift intake cam 13L) coincide with each other. These states are the states in which the phase angles of the intake cams 13L and 13H have been controlled to the phase angles closest to the maximum lead angle end.

The phase angle at the start of opening of the intake valve 8 in the aforesaid states is set to a predetermined phase angle A11 on the lead angle side relative to the top dead center for both the intake cams 13L and 13H. The phase angle A11 is set to be on the lead angle side by, for example, approximately 40 degrees from the phase angle at the top dead center.

Further, the angle width of the open valve period of the intake valve 8 by each of the intake cams 13L and 13H and the phase angle A11 at the start of opening of the intake valve 8 in the state indicated by the solid lines f and g in FIG. 19 are set as described above, so that a phase angle A16 at the end of opening of the intake valve 8 by the large lift intake cam 13H will be on the lag angle side relative to the phase angle at the bottom dead center (on the lag angle side by approximately 40 degrees from the phase angle at the bottom dead center in the present embodiment) in the state indicated by the solid line f in FIG. 19 related to the large lift intake cam 13H.

Further, in the state indicated by the solid line g in FIG. 19 related to the small lift intake cam 13L, a phase angle 14A at the end of opening of the intake valve 8 by the small lift intake cam 13L will be on the lead angle side relative to the phase angle at the bottom dead center (on the lead angle side by approximately 20 degrees from the phase angle at the bottom dead center in the present embodiment).

Supplementarily, the phase angle at the start of opening of the intake valve 8 by the large lift intake cam 13H and the phase angle at the start of opening of the intake valve 8 by the small lift intake cam 13L in the state, wherein the phase angles of the intake cams 13L and 13H have been controlled to the maximum lead angle end, do not have to precisely coincide with each other and may have a slight difference.

The state indicated by the dashed line e in FIG. 19 is the state wherein the phase angle of the large lift intake cam 13H has bee controlled to the maximum lag angle end in the case where the intake valve 8 is opened/closed by the large lift intake cam 13H. In this state, a phase angle A13 at the start of the opening of the intake valve 8 opened/closed by the large lift intake cam 13H is a predetermined phase angle that is on the lag angle side relative to the phase angle A11 and between the phase angle at the top dead center and the phase angle at the bottom dead center.

The phase angle A13 in the present embodiment is set to a phase angle that is delayed by, for example, approximately 60 degrees, from the phase angle A11 at the start of opening of the intake valve 8 in the state indicated by the solid line f in FIG. 19.

In this state, a phase angle A17 at the end of opening of the intake valve 8 opened/closed by the large lift intake cam 13H is more delayed than the phase angle A16 at the end of opening of the intake valve 8 in the state indicated by the solid line f.

The state indicated by the dashed line h in FIG. 19 is the state wherein the phase angle of the small lift intake cam 13L has bee controlled to the maximum lag angle end in the case where the intake valve 8 is opened/closed by the small lift intake cam 13L. In this state, a phase angle A12 at the start of the opening of the intake valve 8 opened/closed by the small lift intake cam 13L is a predetermined phase angle that is on the lag angle side relative to the phase angle A11.

The phase angle A12 in the present embodiment is set to be a phase angle that is delayed by, for example, approximately 30 degrees from the phase angle A11 at the start of opening of the intake valve 8 in the state indicated by the solid line g in FIG. 19. Hence, in the state indicated by the dashed line h in FIG. 19 related to the small lift intake cam 13L, a phase angle A15 at the end of opening of the intake valve 8 is set to a phase angle that has a sufficiently small magnitude of a difference from the phase angle at the bottom dead center, namely, a phase angle that coincides or substantially coincides with the phase angle at the bottom dead center.

According to the present embodiment, the profiles of the intake cams 13L and 13H, the phase angles A11, A12 and A13 at the start of opening of the intake valve 8, and the phase angles A14, A15, A16 and A17 at the end of opening of the intake valve 8 are set as described above. This arrangement makes it possible to variably set the amount of air to be charged into the combustion chamber 3 of each cylinder 2 or the effective compression ratio thereof, as with the first embodiment, by switching the actively driving intake cam, which opens/closes the intake valve 8, to the intake cam 13L or 13H by the valve lift changing mechanism 11 or by changing the phase angle of the intake cam 13L or 13H by the valve phase changing mechanism 10 thereby to change the valve opening pattern of the intake valve 8 as described above.

For example, in the case where the intake valve 8 is opened/closed by the large lift intake cam 13H, the charged air amount or the effective compression ratio of the combustion chamber 3 of each cylinder 2 can be continuously increased by continuously changing the phase angle in the state indicated by the dashed line e in FIG. 19, i.e., the phase angle closest to the maximum lag angle end, toward the phase angle in the state indicated by the solid line f, i.e., the phase angle closest to the maximum lead angle end.

More specifically, according to the present embodiment, when the intake valve 8 is opened/closed by the large lift intake cam 13H, the phase angle at the end of opening of the intake valve 8 changes toward the phase angle at the bottom dead center within the range on the lag angle side relative to the phase angle at the bottom dead center as the phase angle of the large lift intake cam 13H is changed from the lag angle side to the lead angle side. Thus, the Atkinson-cycle (Miller-cycle) operation of the internal combustion engine 1, in which the effective compression ratio becomes smaller than an expansion ratio, is achieved when the intake valve 8 is opened/closed by the large lift intake cam 13H. At the same time, as the phase angle of the large lift intake cam 13H is changed from the lag angle side to the lead angle side, the charged air amount or the effective compression ratio of the combustion chamber 3 of each cylinder 2 increases.

In the case where the intake valve 8 is opened/closed by the small lift intake cam 13L, the charged air amount or the effective compression ratio of the combustion chamber 3 of each cylinder 2 can be continuously increased by continuously changing the phase angle of the small lift intake cam 13L in the state indicated by the solid line g in FIG. 19, i.e., the phase angle closest to the maximum lead angle end, toward the phase angle in the state indicated by the dashed line h, i.e., the phase angle closest to the maximum lag angle end.

More specifically, according to the present embodiment, when the intake valve 8 is opened/closed by the small lift intake cam 13L, the phase angle at the end of opening of the intake valve 8 changes from a phase angle on the lead angle side relative to the phase angle at the bottom dead center toward the phase angle at the bottom dead center as the phase angle of the small lift intake cam 13L is changed from the lead angle side to the lag angle side. Thus, the Atkinson-cycle (Miller-cycle) operation of the internal combustion engine 1, in which the effective compression ratio becomes smaller than an expansion ratio, is achieved also when the intake valve 8 is opened/closed by the small lift intake cam 13L. At the same time, as the phase angle of the small lift intake cam 13L is changed from the lead angle side to the lag angle side, the charged air amount or the effective compression ratio of the combustion chamber 3 of each cylinder 2 increases.

In the state indicated by the dashed line h in FIG. 19, the opening of the intake valve 8 will be started and ended at substantially the same phase angles at the top dead center and the bottom dead center, respectively. In this state, the Otto-cycle operation of the internal combustion engine 1, in which the effective compression ratio is substantially the same as the expansion ratio, is accomplished.

As with the first embodiment, the charged air amount of the combustion chamber 3 of each cylinder 2 is substantially proportional to the effective compression ratio. Thus, the charged air amount of the combustion chamber 3 increases or decreases as the effective compression ratio of the combustion chamber 3 of each cylinder 2 increases or decreases.

In the present embodiment, the profiles of the intake cams 13L and 13H are set such that the charged air amount or the effective compression ratio of the combustion chamber 3 of each cylinder 2 will be the same or substantially the same in both the case where the small lift intake cam 13L is used as the actively driving intake cam and the case where the large lift intake cam 13H is used as the actively driving intake cam in a state wherein the phase angles of the intake cams 13L and 13H are controlled to be the phase angles closest to the maximum lead angle end, i.e., the state wherein the open valve periods of the intake valve 8 actuated by the intake cams 13L and 13H are the open valve periods indicated by the solid lines f and g in FIG. 19.

Hence, the effective compression ratio of the combustion chamber 3 of each cylinder 2 or the charged air amount of the combustion chamber 3 can be maintained at a substantially constant level at the time of switching the actively driving intake cam by switching the actively driving intake cam from one of the intake cams 13L and 13H to the other in the state wherein the phase angles of the intake cams 13L and 13H have been controlled to the phase angles closest to the maximum lead angle end, which correspond to the states indicated by the solid lines f and g in FIG. 19.

According to the present embodiment, a higher effective compression ratio can be achieved by using the small lift intake cam 13L, as compared with the case where the large lift intake cam 13H is used. For this reason, the large lift intake cam 13H is used as the actively driving intake cam for the low-load operation of the internal combustion engine 1, while the small lift intake cam 13L is used as the actively driving intake cam for the high-load operation of the internal combustion engine 1.

The system construction in the present embodiment, including the constructions of the internal combustion engine 1 and the system attached thereto, is the same as that of the first embodiment except for the aspects described above.

The control processing by an electronic control unit 50 in the present embodiment will now be described.

As with the first embodiment, the electronic control unit 50 according to the present embodiment carries out the processing illustrated by the flowchart of FIG. 7 to control the effective compression ratio, the EGR ratio and the throttle opening degree and also to control the operations of fuel injection valves 33 and spark plugs 40.

In this case, the processing is the same as that of the first embodiment except for the control processing related to the effective compression ratio in STEP4 in FIG. 7.

According to the present embodiment, in the control processing related to the effective compression ratio in STEP4 in FIG. 7, the electronic control unit 50 carries out the processing illustrated by the flowchart of FIG. 12 by using a map that is different from the maps shown in FIGS. 13 and 14.

Figure 20:
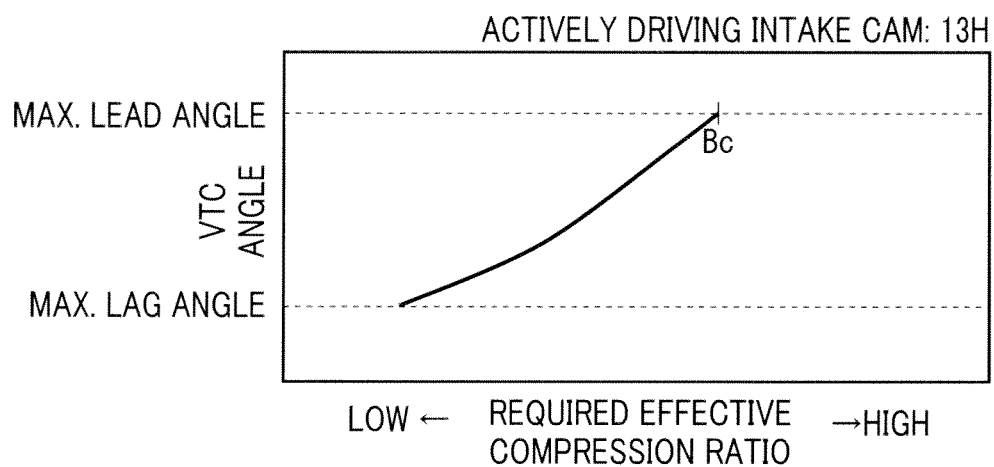
FIGS. 20 and 21 are maps used for the processing in STEP12 and STEP15 of FIG. 12 in the third embodiment.
Figure 21:
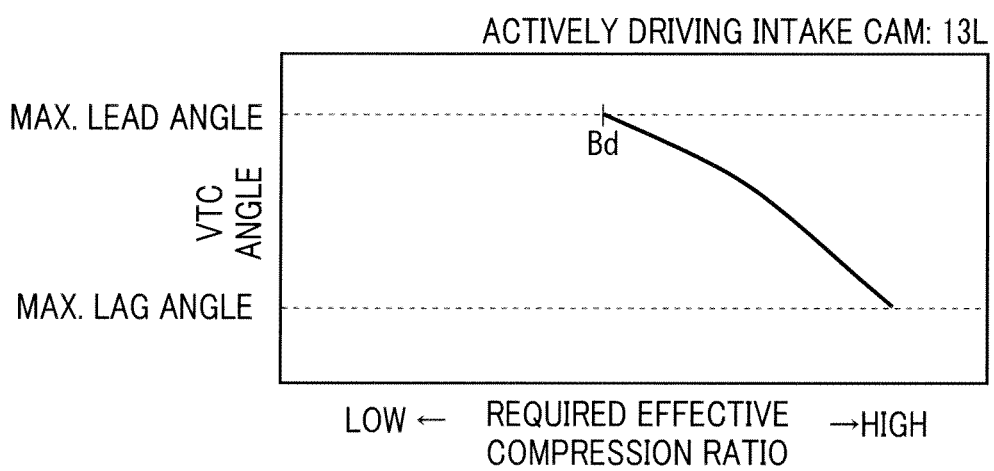

To be more specific, according to the present embodiment, the processing in STEP12 and STEP15 of the flowchart of FIG. 12 is executed by using the map shown in FIG. 20 or FIG. 21.

Specifically, in the processing of STEP12 in the present embodiment, the electronic control unit 50 selects the map in either FIG. 20 or FIG. 21 according to the current operational state of the valve lift changing mechanism 11 acquired in STEP 11 (indicating whether the actively driving intake cam is the intake cam 13L or 13H). Using the selected map, the electronic control unit 50 determines the desired value of a VTC angle as the phase angle of the actively driving intake cam 13L or 13H.

In this case, if the current actively driving intake cam is the large lift intake cam 13H, then the map of FIG. 20 is used. Next, the desired value of the VTC angle (the phase angle of the large lift intake cam 13H) is set according to the map of FIG. 20 on the basis of the required effective compression ratio acquired in STEP 11, as with the first embodiment.

The tendency of the map shown in FIG. 20 is set such that the VTC angle of the large lift intake cam 13H changes in the lead angle direction from the maximum lag angle, which is the phase angle closest to the maximum lag angle end (the phase angle of the large lift intake cam 13H in the state indicated by the dashed line e in FIG. 19), toward the maximum lead angle, which is a phase angle closest to the maximum lead angle end (the phase angle of the large lift intake cam 13H in the state indicated by the solid line f in FIG. 19) as the required effective compression ratio increases (as the load on the internal combustion engine 1 increases) in a region wherein the required effective compression ratio is relatively low, i.e., in a low-load region of the internal combustion engine 1.

If the current actively driving intake cam is the small lift intake cam 13L, then the map of FIG. 21 is used. Next, the desired value of the VTC angle (the phase angle of the small lift intake cam 13L) is set according to the map of FIG. 21 on the basis of the required effective compression ratio acquired in STEP11, as with the first embodiment.

The tendency of the map shown in FIG. 21 is set such that the VTC angle of the small lift intake cam 13L changes in the lag angle direction from the maximum lead angle, which is the phase angle closest to the maximum lead angle end (the phase angle of the small lift intake cam 13L in the state indicated by the solid line g in FIG. 19) to the maximum lag angle, which is a phase angle closest to the maximum lag angle end (the phase angle of the small lift intake cam 13L in the state indicated by the dashed line h in FIG. 19) as the required effective compression ratio increases (as the load on the internal combustion engine 1 increases) in a region wherein the required effective compression ratio is relatively high, i.e., in a high-load region of the internal combustion engine 1.

As with the processing in STEP12 described above, the desired value of the VTC angle is set by using the map of FIG. 20 or FIG. 21 in the processing of STEP 15 according to the present embodiment. In this case, the map to be used is selected depending on whether the small lift intake cam 13L or the large lift intake cam 13H has been selected as the actively driving intake cam by the changeover implemented in the processing in STEP14.

According to the present embodiment, the determination result in STEP13 will be affirmative in the case where the current actively driving intake cam is the large lift intake cam 13H and if the required effective compression ratio is larger than Bc shown in FIG. 20 and also in the case where the current actively driving intake cam is the small lift intake cam 13L and if the required effective compression ratio is smaller than Bd shown in FIG. 21. In other cases than these, the determination result in STEP13 will be negative.

The above-mentioned Bc denotes a value of the required effective compression ratio corresponding to the maximum lead angle of the large lift intake cam 13H (the phase angle in the state indicated by the solid line f in FIG. 19), whereas the above-mentioned Bd denotes a value of the required effective compression ratio corresponding to the maximum lead angle of the small lift intake cam 13L (the phase angle in the state indicated by the solid line g in FIG. 19). These values denoted by Bc and Bd are to set to hold the relationship indicated by Bc>Bd according to the present embodiment. Hence, as with the first embodiment, the switching of the actively driving intake cam in response to a change in the required effective compression ratio is implemented on the basis of a hysteresis characteristic, so that the actively driving intake cam will not be frequently switched even if the required effective compression ratio frequently increases/decreases in the vicinities of Bc and Bd. However, Bc and Bd may have the same value of effective compression ratio.

The control processing carried out by the electronic control unit 50 according to the present embodiment is the same as that in the first embodiment except for the aspects described above.

Supplementarily, in the present embodiment, the large lift intake cam 13H and the small lift intake cam 13L correspond to the first intake cam and the second intake cam, respectively, in the aforesaid fourth aspect of the invention.

The electronic control unit 50 includes the functions as the intake cam switching control unit and the cam phase control unit in the fourth aspect of the invention. In this case, the function as the intake cam switching control unit is implemented by the processing in STEP 14 of the processing illustrated by the flowchart of FIG. 12.

Further, the function as the cam phase control unit is implemented by the processing in STEP16 of the processing illustrated by the flowchart of FIG. 12.

The phase angles A11, A12 and A13 shown in FIG. 19 correspond to the lead-angle-side valve opening start phase angle, the second lag-angle-side open valve start phase angle in the present invention, and the first lag-angle-side open valve start phase angle, respectively, in the forth aspect of the invention.

The state in which the phase angles of the intake cams 13H and 13L are controlled to the states indicated by the solid lines f and g in FIG. 19 corresponds to the specific state in the present invention.

According to the present embodiment described above, the operational state of the intake valve 8 (the phase angle in the open valve period and the lift amount) changes as described below according to the load on the internal combustion engine 1, i.e., the required torque.

For example, in the case where the load on the internal combustion engine 1 increases from the low-load side to the high-load side, the large lift intake cam 13H is used as the actively driving intake cam in the state wherein the load on the internal combustion engine 1 is relatively low, i.e., the required torque is small. Then, the phase angle (the VTC angle) of the large lift intake cam 13H continuously changes from the lag-angle side to the lead-angle side as the load on the internal combustion engine 1 increases.

Hence, the operational state of the intake valve 8 continuously changes toward the state indicated by the solid line f in FIG. 3 from the state indicated by the dashed line e in FIG. 19 (refer to an arrow Y4 in FIG. 19). Thus, the effective compression ratio of the combustion chamber 3 of each cylinder 2 increases.

Then, when the phase angle (the VTC angle) of the large lift intake cam 13H advances to the maximum lead angle, causing the operational state of the intake valve 8 to reach the state indicated by the solid line f in FIG. 19, the actively driving intake cam is changed from the large lift intake cam 13H over to the small lift intake cam 13L. By this time, the phase angle (VTC angle) of the small lift intake cam 13L has reached the maximum lead angle, so that the operational state of the intake valve 8 is switched from the state indicated by the solid line f in FIG. 19 to the state indicated by the solid line g. This causes the lift amount of the intake valve 8 to decrease and the angle width of the open valve period of the intake valve 8 to decrease (refer to an arrow Y5 in FIG. 19).

In this case, in the state wherein the VTC angle has reached the maximum lead angle, the charged air amount of the combustion chamber 3 of each cylinder 2 or the effective compression ratio of the combustion chamber 3 is the same or substantially the same in both the case where the small lift intake cam 13L is used as the actively driving intake cam and the case where the large lift intake cam 13H is used as the actively driving intake cam, as previously described.

Therefore, the charged air amount of the combustion chamber 3 of each cylinder 2 is maintained substantially constant before and after the actively driving intake cam is switched. As a result, switching the actively driving intake cam will not cause a discontinuous change (stepped change) in an output torque of the internal combustion engine 1.

Further, the phase angle at the start of opening of the intake valve 8 immediately before the changeover of the actively driving intake cam and the phase angle at the start of opening of the intake valve 8 immediately after the changeover are both on the lead angle side relative to the top dead center and substantially agree with each other (the same phase angle A11 in the present embodiment). Hence, there will be no sudden change in the amount of exhaust gas charged together with air into the combustion chamber 3 of each cylinder 2 in the open valve period of the intake valve 8 before and after the changeover (the exhaust gas recirculated by an EGR unit 25 or the exhaust gas emitted from the combustion chamber 3 in the exhaust stroke immediately before an intake stroke).

Further, according to the present embodiment, when the load on the internal combustion engine 1 increases and the actively driving intake cam is switched to the small lift intake cam 13L, the phase angle (the VTC angle) of the small lift intake cam 13L continuously changes from the lead angle side to the lag angle side as the load on the internal combustion engine 1 (the required torque) increases. For this reason, the operational state of the intake valve 8 continuously changes from the state indicated by the solid line g in FIG. 19 to the state indicated by the dashed line h (refer to an arrow Y6 in FIG. 19). This causes the effective compression ratio of the combustion chamber 3 of each cylinder 2 to further increase.

According to the present embodiment, therefore, the charged air amount or the effective compression ratio of the combustion chamber 3 of each cylinder 2 smoothly increases without a stepped change when the load on the internal combustion engine 1 increases from the low-load side to the high-load side. In addition, a sudden stepped change in the amount of the exhaust gas to be charged into the combustion chamber 3 of each cylinder 2 before and after switching the actively driving intake cam will be also prevented.

As a result, the output torque of the internal combustion engine 1 can be smoothly increased without the occurrence of a misfire of the internal combustion engine 1, as with the first embodiment.

In the case where the load on the internal combustion engine 1 reduces from the high-load side to the low-load side, the change in the operational state of the intake valve 8 is reversed from that in the case where the load on the internal combustion engine 1 increases. More specifically, the intake valve 8 is opened/closed by the small lift intake cam 13H when the internal combustion engine 1 is run in the high-load operation mode. Then, the phase angle of the open valve period of the intake valve 8 changes in the lead-angle direction from the state indicated by the dashed line h in FIG. 19 to the state indicated by the solid line g as the load on the internal combustion engine 1 reduces.

Subsequently, in the state wherein the phase angles of the intake cams 13L and 13H have been controlled to the maximum lead angles corresponding to the states indicated by the solid lines g and f, respectively, the actively driving intake cam is switched from the small lift intake cam 13L to the large lift intake cam 13H.

When the internal combustion engine 1 is run in the low-load operation mode thereafter, the intake valve 8 is opened/closed by the large lift intake cam 13H. Further, the phase angle in the open valve period of the intake valve 8 changes in the lag-angle direction from the state indicated by the solid line f in FIG. 19 to the state indicated by the dashed line e as the load on the internal combustion engine 1 decreases.

Thus, as with the case where the load increases, the charged air amount or the effective compression ratio of the combustion chamber 3 of each cylinder 2 smoothly decreases without changing in steps even in the case where the load on the internal combustion engine 1 decreases from the high-load side to the low-load side. In addition, a sudden stepped change in the amount of exhaust gas to be charged into the combustion chamber 3 of each cylinder 2 before and after the switching of the actively driving intake cam can be also prevented. As a result, the output torque of the internal combustion engine 1 can be smoothly decreased without the occurrence of a misfire of the internal combustion engine 1.

Further, as with the first embodiment, the effective compression ratio of the combustion chamber 3 of each cylinder 2 increases or decreases as the load on the internal combustion engine 1 increases or decreases, thus making it possible to maintain the degree of opening of the throttle valve 7 at a slightly large degree over an extensive range of load on the internal combustion engine 1. Consequently, the thermal efficiency of the internal combustion engine 1 can be enhanced and the fuel consumption can be restrained.

In the embodiments described above, the examples in which gasoline is used as the fuel of the internal combustion engine 1 have been described. Alternatively, however, the internal combustion engine 1 may use a high-octane fuel, such as ethanol, as the fuel. Further alternatively, the fuel may be a mixed fuel of a high-octane fuel, such as ethanol, and a low-octane fuel, such as gasoline. For an internal combustion engine that uses a mixed fuel of a high-octane fuel and a low-octane fuel, an arrangement may be provided such that the supply proportion of the high-octane fuel and the low-octane fuel for the combustion chamber of each cylinder of the internal combustion engine can be changed.

What is claimed is:

1. A controller for an internal combustion engine, comprising:

an intake valve driving mechanism that has a first intake cam and a second intake cam selectively used to open/close an intake valve, a valve lift changing mechanism that selectively switches an actively driving intake cam, which is an intake cam actually opening/closing the intake valve, to either the first intake cam or the second intake cam, and a valve phase changing mechanism that changes the phase angles of the first and the second intake cams relative to the phase angle of a crankshaft, the profiles of the first and the second intake cams being set such that, in the case where the intake valve is opened/closed by the first intake cam, the lift amount of the intake valve and the angle width of an open valve period are both larger than those in the case where the intake valve is opened/closed by the second intake cam, the profiles of the first and the second intake cams being set such that an angle width of an open valve period of the intake valve opened by the first intake cam is larger than an angle width between a top dead center and a bottom dead center and the angle width of the open valve period of the intake valve opened by the second intake cam becomes an angle width that is closer to an angle width between the top dead center and the bottom dead center than an angle width of the open valve period of the intake valve opened by the first intake cam, and the profiles of the first and the second intake cams being also set such that, in the case where the intake valve is opened/closed by the first intake cam and in the case where the intake valve is opened/closed by the second intake cam, the amounts of air charged into the combustion chamber of the internal combustion engine during the open valve period of the intake valve by the respective intake cams or the effective compression ratios of the combustion chamber agree with each other in both cases in a specific state in which the phase angle of the first intake cam and the phase angle of the second intake cam are controlled such that a phase angle at a start of opening of the intake valve by the first intake cam and a phase angle at a start of opening of the intake valve by the second intake cam agree with each other at a predetermined lead-angle-side valve opening start phase angle on a lead angle side relative to the phase angle at the top dead center, an intake cam switching control unit, which defines the first intake cam out of the first and the second intake cams as the intake cam for a low-load operation of the internal combustion engine and defines the second intake cam as the intake cam for a high-load operation of the internal combustion engine, and controls the valve lift changing mechanism to switch the actively driving intake cam according to the load on the internal combustion engine; and a cam phase control unit, which controls the valve phase changing mechanism to change the phase angle of the actively driving intake cam according to the load on the internal combustion engine at the time of opening/closing the intake valve by each of the first and the second intake cams, wherein the cam phase control unit controls the valve phase changing mechanism such that, at the time of opening/closing the intake valve by the first intake cam, the phase angle at the start of opening of the intake valve changes in a lead angle direction within a range between the lead-angle-side valve opening start phase angle and a predetermined first lag-angle-side valve opening start phase angle closer to a lag angle end than the lead-angle-side valve opening start phase angle as the load on the internal combustion engine increases, and also controls the valve phase changing mechanism such that, at the time of opening/closing the intake valve by the second intake cam, the phase angle at the start of opening of the intake valve changes in a lag angle direction within a range between the lead-angle-side valve opening start phase angle and a predetermined second lag-angle-side valve opening start phase angle closer to a lag angle end than the lead-angle-side valve opening start phase angle as the load on the internal combustion engine increases, the intake cam switching control unit switches the actively driving intake cam in the specific state, the lead-angle-side valve opening start phase angle and the first lag-angle-side valve opening start phase angle are set beforehand such that, in the case where the intake valve is opened/closed by the first intake cam, the amount of air charged into the combustion chamber of the internal combustion engine during the open valve period of the intake valve or the effective compression ratio of the combustion chamber increases as the phase angle at the opening start of the intake valve changes in the lead-angle direction within the range between the lead-angle-side valve opening start phase angle and the first lag-angle-side valve opening start phase angle, and the lead-angle-side valve opening start phase angle and the second lag-angle-side valve opening start phase angle are set beforehand such that, in the case where the intake valve is opened/closed by the second intake cam, the amount of air charged into the combustion chamber of the internal combustion engine during the open valve period of the intake valve or the effective compression ratio of the combustion chamber increases as the phase angle at the opening start of the intake valve changes in the lag angle direction within the range between the lead-angle-side valve opening start phase angle and the second lag-angle-side valve opening start phase angle.

* * * * *